US012640936B2

(12) United States Patent
Simplicio et al.

(10) Patent No.: US 12,640,936 B2
(45) Date of Patent: *May 26, 2026

(54) CRYPTOGRAPHIC METHODS AND SYSTEMS USING BLINDED ACTIVATION CODES FOR DIGITAL CERTIFICATE REVOCATION

(71) Applicants: LG ELECTRONICS, INC., Seoul (KR); UNIVERSITY OF SAO PAULO, Sao Paulo (BR)

(72) Inventors: Marcos A. Simplicio, São Paulo (BR); Eduardo Lopes Cominetti, São Paulo (BR); Harsh Kupwade Patil, Fremont, CA (US); Jefferson E. Ricardini, São Paulo (BR); Marcos Vinicius M. Silva, São Paulo (BR)

(73) Assignees: LG ELECTRONICS, INC., Seoul (KR); UNIVERSITY OF SAO PAULO, Sao Paulo (BR)

( * ) Notice: Subject to any disclaimer, the term of this patent is extended or adjusted under 35 U.S.C. 154(b) by 9 days.

This patent is subject to a terminal disclaimer.

(21) Appl. No.: 17/532,809

(22) Filed: Nov. 22, 2021

(65) Prior Publication Data

US 2022/0158854 A1      May 19, 2022

Related U.S. Application Data

(63) Continuation of application No. 16/267,741, filed on Feb. 5, 2019, now Pat. No. 11,184,180.
(Continued)

(51) Int. Cl.
H04L 9/32          (2006.01)
H04L 9/08          (2006.01)

(52) U.S. Cl.
CPC .......... H04L 9/3268 (2013.01); H04L 9/0894 (2013.01); H04L 9/321 (2013.01); *H04L 2209/42* (2013.01); *H04L 2209/84* (2013.01)

(58) Field of Classification Search
CPC ..... H04L 9/3268; H04L 9/0894; H04L 9/321; H04L 2209/42; H04L 2209/84
See application file for complete search history.

(56) References Cited

U.S. PATENT DOCUMENTS 5,432,852 A     7/1995  Leighton et al.
6,487,658 B1   11/2002  Micali
(Continued)

FOREIGN PATENT DOCUMENTS

CN        102301643 B      12/2014
CN        104901931 B      10/2018
JP        2004-206435 A     7/2004

OTHER PUBLICATIONS

Lawrence et al., "Security credentials Management system (SCMS) design and analysis for the connected vehicle system: draft." National Transportation Library, Dec. 27, 2013 [retrieved on Jan. 24, 2026]. Retrieved from the Internet <URL: https://rosap.ntl.bts.gov/view/dot/32051/dot_32051_DS1.pdf> (Year: 2013).*
(Continued)

*Primary Examiner* — Carl G Colin
*Assistant Examiner* — Zhe Liu
(74) *Attorney, Agent, or Firm* — Duane Morris LLP

(57)          ABSTRACT

To revoke a digital certificate (160$p$), activation of the digital certificate is blocked by withholding an activation code from the certificate user (110). The certificates are generated by a plurality of entities (210, 220, 838) in a robust process that preserves user privacy (e.g. anonymity) even in case of collusion of some of the entities. The process is suitable for
(Continued)

connected vehicles, e.g. as an improvement for Security Credential Management System (SCMS).

18 Claims, 16 Drawing Sheets

Related U.S. Application Data

(60) Provisional application No. 62/626,672, filed on Feb. 5, 2018.

(56) References Cited

U.S. PATENT DOCUMENTS

| | | | | |
|---|---|---|---|---|
| 6,976,162 | B1* | 12/2005 | Ellison | H04L 9/3265 |
| | | | | 713/176 |
| 8,281,149 | B2* | 10/2012 | Laurie | H04L 9/3013 |
| | | | | 713/168 |
| 8,732,457 | B2 | 5/2014 | Micali | |
| 9,094,206 | B2 | 7/2015 | Di Crescenzo et al. | |
| 9,425,967 | B2 | 8/2016 | Tseng et al. | |
| 9,584,320 | B1* | 2/2017 | Parkinson | H04L 9/3066 |
| 10,439,825 | B1 | 10/2019 | Meyer et al. | |
| 11,184,180 | B2* | 11/2021 | Simplicio, Jr. | H04L 9/3268 |
| 11,190,363 | B2* | 11/2021 | Simplicio, Jr. | H04L 9/0861 |
| 2003/0009612 | A1 | 1/2003 | Latta | |
| 2003/0115468 | A1* | 6/2003 | Aull | H04L 63/062 |
| | | | | 713/175 |
| 2005/0114653 | A1* | 5/2005 | Sudia | H04L 9/3263 |
| | | | | 713/158 |
| 2005/0154878 | A1 | 7/2005 | Engberg et al. | |
| 2005/0222932 | A1* | 10/2005 | Murashita | G06Q 20/3821 |
| | | | | 705/35 |
| 2006/0137006 | A1 | 6/2006 | Ramzan et al. | |
| 2007/0116271 | A1 | 5/2007 | Kurdziel | |
| 2007/0222555 | A1 | 9/2007 | Tengler et al. | |
| 2007/0244833 | A1* | 10/2007 | Camenisch | H04L 9/3234 |
| | | | | 705/71 |
| 2008/0052772 | A1 | 2/2008 | Conrado et al. | |
| 2008/0189774 | A1 | 8/2008 | Ansari et al. | |
| 2008/0211624 | A1 | 9/2008 | Micali et al. | |
| 2008/0232595 | A1* | 9/2008 | Pietrowicz | H04L 9/3297 |
| | | | | 380/277 |
| 2008/0301447 | A1* | 12/2008 | Hughes | H04L 9/0891 |
| | | | | 713/176 |
| 2009/0259841 | A1 | 10/2009 | Laberteaux et al. | |
| 2009/0262930 | A1* | 10/2009 | Lambert | G06F 7/725 |
| | | | | 380/46 |
| 2009/0298576 | A1 | 12/2009 | Nguyen | |
| 2010/0111307 | A1 | 5/2010 | Hu et al. | |
| 2010/0205457 | A1 | 8/2010 | Jogand-Coulomb et al. | |
| 2010/0317420 | A1 | 12/2010 | Hoffberg | |
| 2011/0055556 | A1 | 3/2011 | Choi et al. | |
| 2011/0191581 | A1 | 8/2011 | Shim et al. | |
| 2011/0258435 | A1 | 10/2011 | Bellur et al. | |
| 2012/0070000 | A1 | 3/2012 | Baechler et al. | |
| 2012/0072718 | A1 | 3/2012 | Ronda et al. | |
| 2012/0072723 | A1 | 3/2012 | Orsini et al. | |
| 2012/0079602 | A1 | 3/2012 | Kolesnikov et al. | |
| 2012/0102318 | A1 | 4/2012 | Vanstone | |
| 2012/0173873 | A1* | 7/2012 | Bell | H04L 9/3263 |
| | | | | 713/168 |
| 2012/0204032 | A1 | 8/2012 | Wilkins et al. | |
| 2012/0233705 | A1* | 9/2012 | Boysen | G06F 21/77 |
| | | | | 726/29 |
| 2013/0159702 | A1* | 6/2013 | Peeters | H04L 9/3263 |
| | | | | 713/156 |
| 2013/0227297 | A1 | 8/2013 | Gantman et al. | |
| 2014/0025950 | A1 | 1/2014 | Peeters et al. | |
| 2014/0059348 | A1 | 2/2014 | Ronda et al. | |
| 2014/0093077 | A1 | 4/2014 | Jawurek et al. | |
| 2015/0222604 | A1 | 8/2015 | Ylonen | |
| 2015/0256348 | A1 | 9/2015 | Tschache | |

| | | | | |
|---|---|---|---|---|
| 2016/0119151 | A1* | 4/2016 | Park | H04W 12/043 |
| | | | | 713/158 |
| 2016/0218875 | A1* | 7/2016 | Le Saint | H04L 9/0825 |
| 2017/0180989 | A1 | 6/2017 | Etzel et al. | |
| 2017/0222990 | A1 | 8/2017 | Romansky et al. | |
| 2017/0244676 | A1* | 8/2017 | Edwards | H04W 12/06 |
| 2017/0346633 | A1* | 11/2017 | Bos | H04L 9/002 |
| 2018/0006829 | A1 | 1/2018 | Kravitz et al. | |
| 2018/0137261 | A1 | 5/2018 | Lattin et al. | |
| 2018/0219678 | A1 | 8/2018 | Medvinsky et al. | |
| 2018/0316511 | A1 | 11/2018 | Meyer et al. | |
| 2019/0020629 | A1* | 1/2019 | Baird, III | H04L 9/3297 |
| 2019/0109711 | A1* | 4/2019 | Gladwin | H04L 9/0869 |
| 2019/0116048 | A1 | 4/2019 | Chen et al. | |
| 2019/0123915 | A1 | 4/2019 | Simplicio, Jr. et al. | |
| 2019/0215165 | A1 | 7/2019 | Simplicio, Jr. et al. | |
| 2019/0238342 | A1 | 8/2019 | Lian et al. | |
| 2019/0245703 | A1 | 8/2019 | Simplicio Junior, Jr. et al. | |
| 2019/0245831 | A1 | 8/2019 | Petit et al. | |
| 2019/0392120 | A1 | 12/2019 | Lattin et al. | |

OTHER PUBLICATIONS

NISTp256 "Recommended Elliptic Curves for Federal Government Use," National Institute of Standards and Technology_Available at: http://csrc.nisl.gov/groups/ST/loolkil/documents/dss/NISTReCur.doc. Jul. 1999. pp. 1-43.

Paillier, "Public-Key Cryptosystems Based on Composite Degree Residuosity Classes," Advances in Cryptology—Eurocrypt'99. Springer-Verlag. Berlin, Heidelberg. 1999. pp. 223-238.

P. Papadimitratos et al., Vehicular Communication Systems: Enabling Technologies, Applications, and Future Outlook on Intelligent Transportation, IEEE Communications Magazine, vol. 47, No. 11. Nov. 2009. pp. 84-95.

C. Perera et al., "Context Aware Computing for the Internet of Things: A survey," IEEE Communications Surveys lrutorials, vol. 16, No. 1. Winter 2014. pp. 414-454.

J. Petit et al., "Pseudonym Schemes in Vehicular Networks: A survey," Articles in IEEE Communications Surveys lrutorials, vol. 17, No. 1. Aug. 15, 2015. pp. 228-255.

B. Preneel et al., "Data Encryption Standard (DES)," Boston, Mass.: Springer US. 2005. pp. 136-136.

M. Raya et al., "Eviction of Misbehaving and Faulty Nodes in Vehicular Networks," IEEE Journal on Selected Areas in Communications, vol. 25, No. 8. Oct. 2007. pp. 1-12.

F. Schaub et al., "Privacy Requirements in Vehicular Communication Systems," in Proceedings of the International Conference on Computational Science and Engineering, vol. 3. IEEE, 2009, pp. 139-145.

M. Simplicio et al., "A Privacy-Preserving Method for Temporarily Linking/Revoking Pseudonym Certificates in Vehicular Networks," 17th IEEE International Conference on Trust, Security and Privacy In Computing and Communications. New York, New York. Available at: https://eprint.iacr.org/2018/185.pdf, Jul. 31-Aug. 3, 2018. pp. 1-19.

M. Simplicio et al., "The Unified Butterfly Effect: Efficient Security Credential Management System for Vehicular Communications," International Association of Cancer Registries (IACR). Available at: https:I/eprint.iacr.org/2018/089.pdf, Nov. 13-15, 2018. pp. 1-9.

E. Verheul, "Activate Later Certificates for V2X.—Combining ITS Efficiency With Privacy," Cryptology ePrint Archive, Report 2016/1158, 2016. Available at: http:/leprint.iacr.org/2016/1158, Dec. 22, 2016. pp. 1-28.

NIST, Special Publication 800-131A Rev. 1—"Transitions: Recommendation for Transitioning the Use of Cryptographic Algorithms and Key Lengths," National Institute of Standards and Technology, U.S. Department of Commerce, Gaithersburg, MD, USA, Jan. 2011. dOl:10.6028/NIST.SP.800-131Arl. pp. 1-27.

International Search Report by the International Searching Authority for PCT Application No. PCT/US2019/016658, May 14, 2019, pp. 1-8.

Written Opinion issued of the International Searching Authority for PCT Application No. PCT/US2019/016658, May 14, 2019, pp. 1-6.

(56)　　　　　References Cited

OTHER PUBLICATIONS

Simplicio Jr. et al., "ACPC: Efficient revocation of pseudonym certificates using activation codes", Published by t:: Isevier B.V., Ad Hoc Networks, 2018, p. 1-23.

Virendra Kumar et al., "Binary Hash Tree based Certificate Access Management for Connected Vehicles", WiSec 17: Proceedings of the 10th ACM Conference on Security and Privacy in Wireless and Mobile, USA, Sep. 18, 2017, pp. 145-155.

William Whyte et al., "A Security Credential Management System for V2V Communications", 2013 IEEE Vehicular Networking Conference, U.S.A., IEEE, 2013-12-16, p. 1-8.

Verheul, "Issue First Activate Later Certificates for V2X—Combining ITS efficiency with privacy", IACR International Association for Cryptologic Research, vol. 20161222:090905, Dec. 18, 2016,Dec. 18, 2016), pp. 1-28.

European Patent Office, "Extended European Search Report", dated Aug. 13, 2021, 11 pages.

Yipin Sun et al., "NEHCM: A Novel and Efficient Hash-chain based Certificate Management Scheme for Vehicular Communications" 2010 5th International ICST Conference on Communications and Networking in China. (Year: 2010) (Year: 2010).

Domain Control Validation (DCV) for SSL Certificate Naija Domains, Jan. 13, 2017; [retrieved on Apr. 7, 2021]. From the Internet: <URL: https://web.archive.org/web/20170113211014/ https://help.naijadomains. com/ can-complete-domain-control-validation-dcv-ssl-certificate/> (Year: 2017).

Jin Wang et al., "RP Rep: A Robust and Privacy-Preserving Reputation management Scheme for Pseudonym-Enabled VANETs" International Journal of Distributed Sensor Networks, vol. 2016, Article ID 6138251. (Year: 2016).

International Search Report and Written Opinion issued by the International Searching Authority on Apr. 22, 2019 for PCT Application No. PCT/US2019/013084. pp. 1-16.

U.S. Appl. No. 62/561,667, filed Sep. 21, 2017.

U.S. Appl. No. 16/136,621, filed Sep. 20, 2018.

U.S. Appl. No. 16/165,871, filed Oct. 19, 2018.

PCT Patent Application No. PCT/US2018/056784, filed Oct. 19, 2018.

W. Aiello et al., "Fast Digital Identity Revocation (extended abstract)," in Proc. of the 18th Annual International ryptology Conference on Advances in Cryptology (CRYPTO'98). London, UK Springer-Verlag, 1998 pp. 137-152.

International Search Report and Written Opinion issued by the International Searching Authority on Feb. 7, 2019 or PCT Application No. PCT/US2018/056784. pp. 1-17.

Zheng et al., "Digital Signcryption or How to Achieve Cost (Signature & Encryption) Cost (Signature)+ Cost Encryption)," Advances in Cryptology—CRYPTO '97: 17th Annual International Cryptology Conference. Berlin, Heidelberg. 1997. pp. 1-15.

K. Alheeti et al., "An Intrusion Detection System Against Malicious Attacks on the Communication Network of Driverless cars," in 12th Annual IEEE Consumer Communications and Networking Conference (CCNC), Jan. 2015, pp. 916-921.

E. Andrade et al., "Lyra2: Efficient Password Hashing with High Security Against Time-Memory Trade-Offs," IEEE Transactions on Computers, vol. 65, No. 10. Sao Paulo, Brazil, 2016 pp. 3096-3108. see also: http://eprinl.iacr.Jrg/2015/136.

D. Bernstein et al., "EdDSA for More Curves," Journal of Cryptographic Engineering, vol. 2, No. 2. Jul. 4, 2015. Available at: http://ed25519.cr.yp.to/eddsa-20150704.pdf. pp. 1-5.

D. Bernstein et al., "High-Speed High-Security Signatures", In Cryptographic Hardware and Embedded Systems—:; HES 2011. Berlin, Heidelberg, 2011, Springer Berlin Heidelberg. Oct. 5, 2011. pp. 124-142.

E. Biham et al., "How to Decrypt or Even Substitute DES—Encrypted Messages in 228 Steps," Information Processing cellers, vol. 84, No. 3. Mar. 1, 2002. pp. 117-124.

D. Brown et al., "Provably Secure Implicit Certificate Scheme," Financial Cryptography, pp. 156-165, Berlin, Heidelberg, 2002. Springer-Verlag. pp. 1-10.

CAMP LLC, "Security Credential Management System Proof-of-Concept Implementation—EE Requirements and Specifications Supporting SCMS Software Release 1.1," Vehicle Safety Communications Consortium, Tech. Rep., May 4, 2016. [Online]. Available: https://www.its.dol.gov/pilots/pdf/SCMS_POC_EE_Requirements. pdf. pp. 1-559.

Certicom Research, "Sec 4: Elliptic Curve Ou-Vanstone Implicit Certificate Scheme (ECQV)," Certicom Research. Standards for Efficient Cryptography. Jan. 24, 2013, http://www.secg.org/sec4-1. 0.pdf. pp. 1-32.

S. Chen et al., Vehicle-to-Everything (v2x) Services Supported by L TE-Based Systems and 5G, IEEE Communications Standards Magazine, vol. 1, No. 2. Jun. 2017. pp. 70-76.

P. Cincilla et al., Vehicular PKI Scalability-Consistency Trade-Offs in Large Scale Distributed Scenarios, in IEEE Vehicular Networking Conference (VNC), Dec. 2016, pp. 1-8.

D. Cooper et al., "RFC 5280—Internet X.509 Public Key Infrastructure Certificate and Certificate Revocation List CRL) proflle," RFC 5280—hllps://lools.ielf.org/hlml/rfc5280#section-4.2.1.3, May 2008. pp. 1-151.

J. Coron et al., "Universal Padding Schemes for RSA," Advances in Cryptology (CRYPTO'02), London, UK, 2002. Springer. pp. 226-241.

J. Douceur, "The Sybil attack," in Proc. of 1st International Workshop on Peer-to-Peer Systems (IPTPS). Microsoft Research. Springer, Jan. 2002. Available at: hllps://www.microsofl.com/en-us/research/publication/lhe-sybil-?ttack/. pp. 1-6.

ETSI, "TR 102 941—Intelligent Transport Systems (ITS); Security; Trust and Privacy Management," European Telecommunications Standards Institute, Tech. Rep., Jun. 2012. pp. 1-30.

Federal Information Processing Standard (FIPS 186-4)—Digital Signature Standard (DSS), National Institute of Standards and Technology, U.S. Department of Commerce. Jul. 2013. pp. 1-130.

D. Forster et al., "PUCA: A Pseudonym Scheme with Strong Privacy Guarantees for Vehicular Ad-hoc Networks," Ad Hoc Networks, vol. 37. Special Issue on Advances in Vehicular Networks. 2015. pp. 1-11.

Gemalto, "SafeNet Luna Network HSM" SafeNet Identity & Data Protection Solutions from Gemalto—product brief Available at: hllps://safenel.gemalto.com/. Nov. 18, 2018. pp. 1-7.

J. Haas et al., "Design and Analysis of a Lightweight Certificate Revocation Mechanism for Vane!," in Proceedings of he Sixth ACM International Workshop on Vehicular Internet Working. ACM. Sep. 25, 2009, pp. pp. 1-10.

J. Harding et al., "Vehicle-to-Vehicle Communications: Readiness of V2V Technology for Application," National Highway Traffic Safety Administration. Washington, DC, USA, Tech. Rep. DOT HS 812 014. Aug. 2014. pp. 1-327.

IEEE, "IEEE Standard for Wireless Access in Vehicular Environments—Security Services for Applications and Management Messages—Amendment 1," IEEE Sid 1609.2a-2017 {Amendment to IEEE Sid 1609.2-2016), Sep. J8, 2017. pp. 1-123.

IEEE, "IEEE Standard Specifications for Public-Key Cryptography—Amendment 1: Additional Techniques," IEEE :; omputer Society. Sep. 2, 2004. pp. 1-168.

A.Iyer et al., "Secure V2V Communications: Performance Impact of Computational Overheads," Proceedings of the EEE INFOCOM Workshops. Apr. 2008. pp. 1-8.

D. Jiang et al., "IEEE 802.11 p: Towards an International Standard for Wireless Access in Vehicular Environments," in EEE Vehicular Technology Conference (VTC Spring). May 2008. pp. 2036-2040.

S. Josefsson et al., "Edwards-Curve Digital Signature Algorithm," {EdDSA) Available at: hllps://lools.ielf.org/hlml/rfc8032. Jan. 2017. pp. 1-60.

M. Khodaei et al., "The Key to Intelligent Transportation: Identity and Credential Management in Vehicular Communication Systems," IEEE Vehicular Technology Magazine, vol. 10, No. 4. Dec. 2015. pp. 63-69.

L. Lamport, "Password Authentication With Insecure Communication," Commun. ACM, National Science roundalion, vol. 24, No. 11. Menlo Park, CA. 1901. pp. 770-772.

(56) References Cited

OTHER PUBLICATIONS

K. Lauter et al., "The Elliptic Curve Discrete Logarithm Problem and Equivalent Hard Problems for Elliptic Divisibility Sequences," Selected Areas in Cryptography {SAC'08), Springer, 2008. pp. 309-327.

D.McGrew et al., "Hash-Based Signatures," Internet Engineering Task Force, Internet-Draft Draft-Mcgrew-Hash-Sigs-06. Available at: https://dalatracker.ielf.org/doc/hlml/drafl-mcgrew-hash-sigs-06. Sep. 6, 2017. pp. 1-51.

R. Moalla et al., "Risk Analysis Study of ITS Communication Architecture." in 3rd International Conference on The Network of the Future. Paris, France. 2012. pp. 1-5.

N. Mouha et al., "Multi-Key Security: The Even-Mansour Construction Revisited," in Advances in Cryptology CRYPTO 2015: 35th Annual Cryptology Conference. Berlin, Heidelberg: Springer Berlin Heidelberg. Aug. 16-20, 2015. pp. 1-16.

NHTSA, "Federal Motor Vehicle Safety Standards; V2V Communication," National Highway Traffic Safety Administration, U.S. Department of Transportation (USDOT), Tech. Rep. Available at: hllps://www.federalregister.gov/ :documents/2017 /01/12/2016-31059/federal-motor-vehicle-safety-standards-v2v-communications. Jan. 12, 2017. pp. 1-166.

NIST, "Secure Hash Standard (SHS)," Federal Information Processing Standard (FIPS 180-4). National Institute of Standards and Technology, U S. Department of Commerce. (NIST), Gaithersburg, MD, USA. DOI:10.6028/NIST. FIPS. 180-4. Aug. 5, 2015. pp. 1-36.

NIST, Federal Information Processing Standard (FIPS 197)— "Advanced Encryption Standard (AES)," National nstitute of Standards and Technology, U.S. Department of Commerce. Gaithersburg, MD, USA. Available at: http:// ::src.nisl.gov/publications/fips/fips197/fips-197.pdf. Nov. 26, 2001. pp. 1-51.

NIST, Federal Information Processing Standard (FIPS 202)— SHA-3 Standard, "Permutation-Based Hash and Extendable-Output Functions," National Institute of Standards and Technology, U.S. Department of Commerce. Gaithersburg, MD, USA. DOI:10.6028/NIST.FIPS.202. Aug. 2015. pp. 1-37.

European Patent Office, "Extended European Search Report", Application No. 19747989.2, dated Nov. 9, 2021, 10 pages.

Office Action for corresponding Chinese Patent Application No. 201980011608.5 dated Nov. 17, 2022, 17 pages.

* cited by examiner

Key to

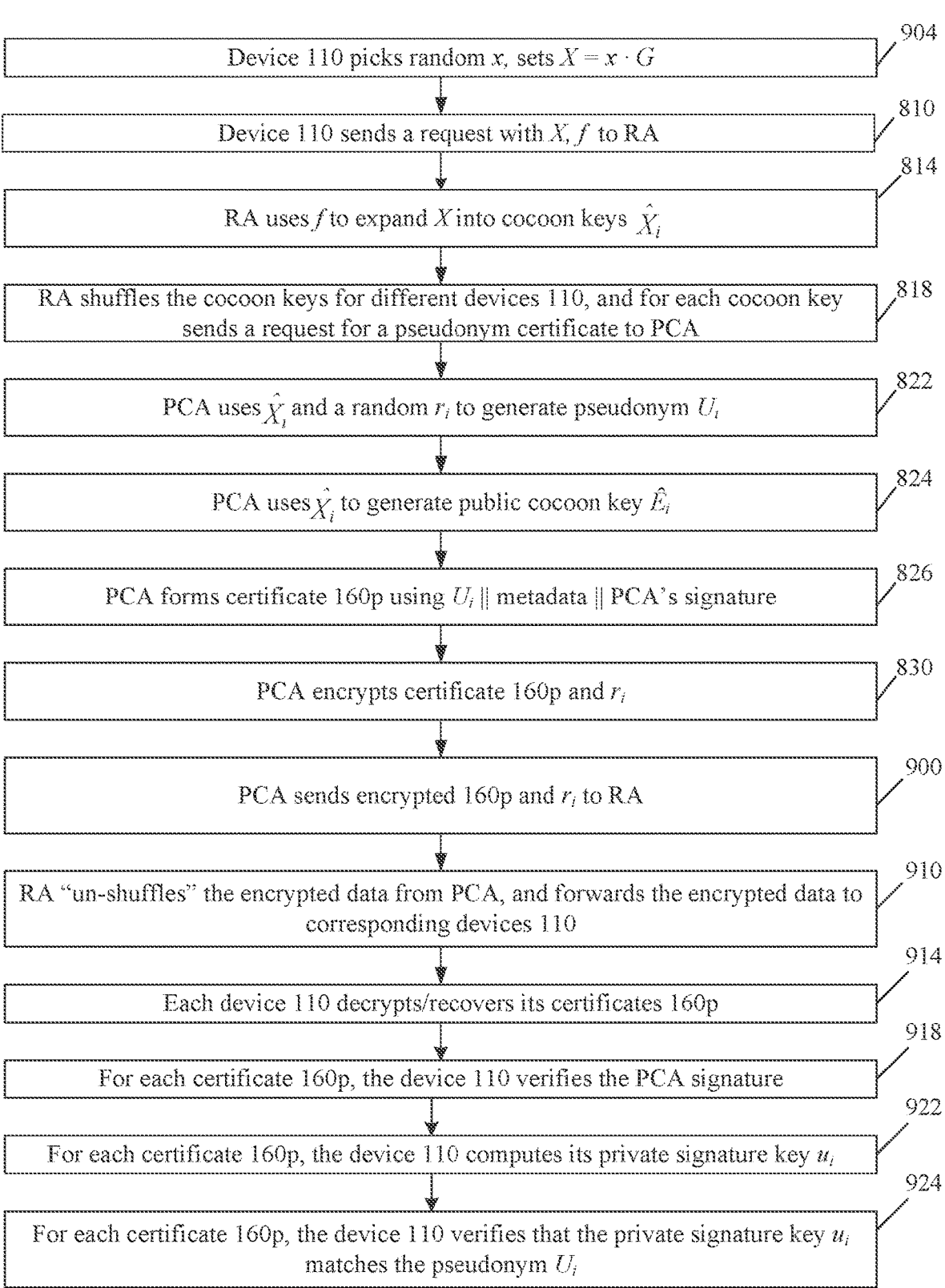

Device 110 picks random $x$, sets $X = x \cdot G$ — 904

Device 110 sends a request with $X$, $f$ to RA — 810

RA uses $f$ to expand $X$ into cocoon keys $\hat{X}_i$ — 814

RA shuffles the cocoon keys for different devices 110, and for each cocoon key sends a request for a pseudonym certificate to PCA — 818

PCA uses $\hat{X}_i$ and a random $r_i$ to generate pseudonym $U_i$ — 822

PCA uses $\hat{X}_i$ to generate public cocoon key $\hat{E}_i$ — 824

PCA forms certificate 160p using $U_i \parallel$ metadata $\parallel$ PCA's signature — 826

PCA encrypts certificate 160p and $r_i$ — 830

PCA sends encrypted 160p and $r_i$ to RA — 900

RA "un-shuffles" the encrypted data from PCA, and forwards the encrypted data to corresponding devices 110 — 910

Each device 110 decrypts/recovers its certificates 160p — 914

For each certificate 160p, the device 110 verifies the PCA signature — 918

For each certificate 160p, the device 110 computes its private signature key $u_i$ — 922

For each certificate 160p, the device 110 verifies that the private signature key $u_i$ matches the pseudonym $U_i$ — 924

FIG. 10B

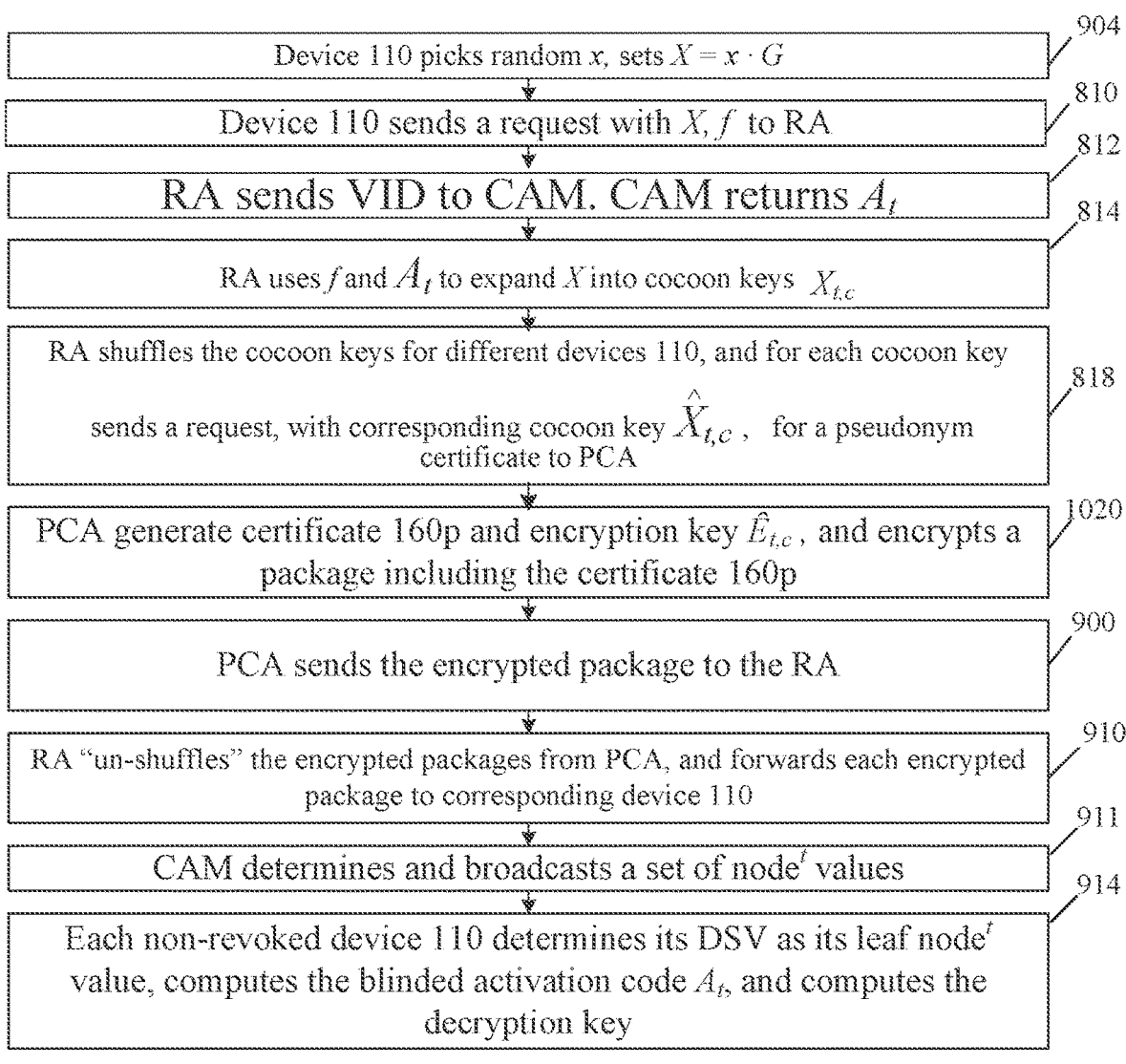

Device 110 picks random $x$, sets $X = x \cdot G$ /904

Device 110 sends a request with $X, f$ to RA /810

RA sends VID to CAM. CAM returns $A_t$ /812

RA uses $f$ and $A_t$ to expand $X$ into cocoon keys $X_{t,c}$ /814

RA shuffles the cocoon keys for different devices 110, and for each cocoon key sends a request, with corresponding cocoon key $\hat{X}_{t,c}$, for a pseudonym certificate to PCA /818

PCA generate certificate 160p and encryption key $\hat{E}_{t,c}$, and encrypts a package including the certificate 160p /1020

PCA sends the encrypted package to the RA /900

RA "un-shuffles" the encrypted packages from PCA, and forwards each encrypted package to corresponding device 110 /910

CAM determines and broadcasts a set of node$^t$ values /911

Each non-revoked device 110 determines its DSV as its leaf node$^t$ value, computes the blinded activation code $A_t$, and computes the decryption key /914

FIG. 14B

CRYPTOGRAPHIC METHODS AND SYSTEMS USING BLINDED ACTIVATION CODES FOR DIGITAL CERTIFICATE REVOCATION

CROSS REFERENCE TO RELATED APPLICATIONS

This patent application is a continuation application of and claims priority to U.S. patent application Ser. No. 16/267,741, filed Feb. 5, 2019 and entitled "CRYPTO-GRAPHIC METHODS AND SYSTEMS USING BLINDED ACTIVATION CODES FOR DIGITAL CER-TIFICATE REVOCATION," and further claims priority to U.S. Provisional Patent Application No. 62/626,672, "METHOD FOR EFFICIENT AND SECURE REVOCA-TION OF PSEUDONYM CERTIFICATES USING ACTI-VATION CODES," filed on 5 Feb. 2018, incorporated herein by reference.

COPYRIGHT NOTICE

BACKGROUND OF THE INVENTION

The present invention relates to secure communications, including transportation-related communications among cars, trucks, trains, and possibly other vehicles, as well as pedestrians' smartphones, traffic lights, and other infrastructure.

In recent times, there has been a surge in digital technologies embedded in physical objects, leading to what is today known as Internet of Things (IoT). This trend has also reached the automotive industry, which has shown a growing interest in exploring interaction models such as Vehicle-to-Vehicle (V2V), Vehicle-to-Infrastructure (V2I) and Vehicle-to-Pedestrian (V2P), collectively referred to as Vehicle-to-Everything (V2X) communications. V2X enables several applications aimed at improving transportation safety, efficiency, and human to machine interaction. For example, with V2X, vehicles can exchange or communicate information (e.g., for velocity, direction and brake status) that can help drivers keep a safe distance from other vehicles while maintaining a suitable speed.

Indeed, the U.S. Department of Transportation has initiated a "connected vehicles" program "to test and evaluate technology that will enable cars, buses, trucks, trains, roads and other infrastructure, and our smartphones and other devices to 'talk' to one another. Cars on the highway, for example, would use short-range radio signals to communicate with each other so every vehicle on the road would be aware of where other nearby vehicles are. Drivers would receive notifications and alerts of dangerous situations, such as someone about to run a red light as they [are] nearing an intersection or an oncoming car, out of sight beyond a curve, swerving into their lane to avoid an object on the road." U.S. Department of Transportation at https://www.its.dot.gov/cv_basics/cv_basics_what.htm. "Connected vehicles could dramatically reduce the number of fatalities and serious injuries caused by accidents on our roads and highways.

[They] also promise to increase transportation options and reduce travel times. Traffic managers will be able to control the flow of traffic more easily with the advanced communications data available and prevent or lessen developing congestion. This could have a significant impact on the environment by helping to cut fuel consumption and reduce emissions."

While V2X technology and connected vehicles offer the promise of increased safety, traffic flow, efficiency, etc., the large scale deployment of such technologies also requires addressing some challenges, especially security and privacy concerns. In particular, V2X architectures are expected to (1) ensure that messages exchanged between vehicles are legitimate, banning misbehaving users, while (2) preserving the anonymity of honest users, so their movements cannot be easily tracked by other vehicles or by the system itself.

To ensure that the messages exchanged between vehicles are legitimate, a vehicle may digitally sign each message using the vehicle's private key. The message recipient can verify the signature using the sending vehicle's public key. The public keys themselves are authenticated by means of digital certificates which certify that a given public key belongs to an authorized vehicle. The certificates are distributed by trusted computer entities called Certificate Authorities (CAs). Each certificate is signed by the CA, allowing the message recipient to confirm the certificate's authenticity by verifying the CAs signature.

If the vehicle misbehaves, the vehicle's certificate should be revoked. Therefore, a trusted entity periodically distributes a certificate revocation list (CRL) identifying the revoked certificates. The CRL size however is directly proportional to the number of the revoked certificates or revoked vehicles, and can be large, especially since a single vehicle may have multiple certificates corresponding to different validity periods. Further, a vehicle may have multiple certificates corresponding to the same validity period to make the vehicle difficult to trace by a malicious person, and this further increases the CRL size.

To reduce the CRL size, the certificate revocation can use activation codes. When a vehicle receives a certificate, the vehicle cannot decrypt the certificate without an activation code. However, the activation code for each certificate is provided to the vehicle only shortly before the certificate's validity period. See, for example, E. Verheul, "Activate later certificates for V2X—combining ITS efficiency with privacy," Cryptology ePrint Archive, Report 2016/1158, 2016, http://eprint.iacr.org/2016/1158; and V. Kumar, J. Petit, and W. Whyte, "Binary hash tree based certificate access management for connected vehicles," in Proc. of the 10th ACM Conference on Security and Privacy in Wireless and Mobile Networks, ser. WiSec'17. New York, NY, USA: ACM, 2017, pp. 145-155; both incorporated herein by reference. To increase the efficiency of the certificate generation process, the certificates are generated in batch, possibly long in advance of their respective validity periods, but if a certificate is revoked it does not have to be included in the CRL if the activation code has not been issued. The CRL size is therefore reduced.

It is desirable to reduce the computation costs and the network bandwidth in provisioning and activating the certificates. Further, the use of certificates is complicated by the need to ensure that a dishonest, or "honest but curious", certificate management entities cannot easily compromise the system even if they collude. It is desirable to reduce the security risks presented by the certificate management entities.

SUMMARY

This section summarizes some features of the invention. Other features may be described in the subsequent sections. The invention is defined by the appended claims, which are incorporated into this section by reference.

Some embodiments of the present disclosure provide certificate management techniques using activation codes. Some of the existing certificate management systems can be retrofitted to use the activation code techniques according to some embodiments of the present disclosure with only minimal additional computational cost and bandwidth utilization. Also, user privacy (anonymity) is protected even if some of the certificate management entities collude.

The invention is not limited to the features described above except as defined by the appended claims.

BRIEF DESCRIPTION OF THE DRAWINGS

FIGS. 10A, 10B, 11A, 11B are flowcharts illustrating certificate issuance techniques used in some embodiments of the present disclosure.

FIGS. 14A, 14B illustrate digital certificate management used in some embodiments of the present disclosure.

DETAILED DESCRIPTION OF SOME EMBODIMENTS

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent to one skilled in the art, however, that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Example Environment

Figure 1:
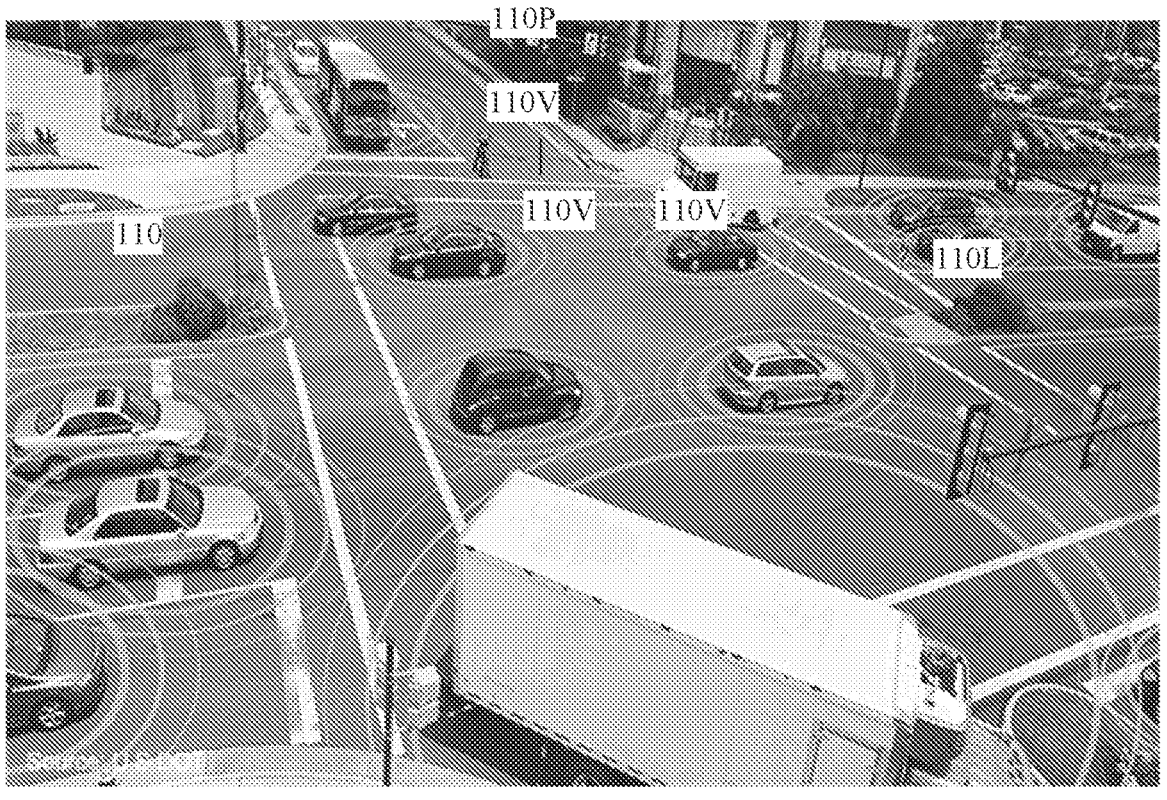
FIG. 1 illustrates an environment in which systems and methods of the present disclosure can operate.

FIG. 1 illustrates an environment in which systems and methods of the present disclosure can operate. FIG. 1 shows a busy intersection with various entities or objects, such as vehicles 110V (cars, trucks, and possibly other types, e.g. trains or bicycles), pedestrians 110P, roadside equipment 110L (e.g., traffic lights, along with hub or gateway for short and longer-range communications). Each of objects or entities 110 (110V, 110L, 110P, etc.) carries or incorporates equipment, such as smartphones, automotive information devices, or other computing devices. Using their respective computing devices, the objects or entities 110 communicate (e.g., wirelessly) to share information, coordinate, etc. Each vehicle 110V may, for example, broadcast its location, speed, acceleration, route, direction, weather information, etc. Such broadcasts can be used to obtain advance information on traffic jams, accidents, slippery road conditions, and allow each vehicle to know where the other vehicles are, and so on. In response, vehicle recipients of such information may alert their drivers, to advise the drivers to stop, slow down, change routes, take a detour, and so on. The traffic lights can be automatically adjusted based on the traffic conditions broadcast by the vehicles and/or other objects 110.

Figure 2:
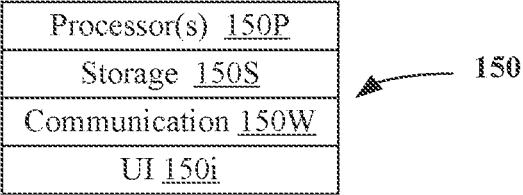
FIG. 2 is a block diagram of a computing device for use in the example environment.

FIG. 2 illustrates an embodiment of a computing device 150 used by the vehicles or other entities and objects, e.g., for communicating, coordinating, etc. in the environment of FIG. 1. As shown in FIG. 2, computing device 150 includes one or more computer processors 150P coupled to computer storage (memory) 150S, and wireless communication equipment 150W for radio communications. Operation of computing device 150 is controlled by processor 150P, which may be implemented as one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 150P.

Memory 150S may be used to store software executed by computing device 150 and/or one or more data structures used during operation of computing device 150. Memory 150S may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, EEPROM, FLASH-EPROM, any other memory chip or cartridge, and/or any other medium from which a processor or computer is adapted to read.

Processor 150P and/or memory 150S may be arranged in any suitable physical arrangement. In some embodiments, processor 150P and/or memory 150S may be implemented on a same board, in a same package (e.g., system-in-package), on a same chip (e.g., system-on-chip), and/or the like. In some embodiments, processor 150P and/or memory 150S may include distributed, virtualized, and/or containerized computing resources. Consistent with such embodiments, processor 150P and/or memory 1505 may be located in one or more data centers and/or cloud computing facilities. In some examples, memory 150S may include non-transitory, tangible, machine readable media that includes executable code that when run by one or more processors (e.g., processor 150P) may cause the computing device 150, alone or in conjunction with other computing devices in the environment, to perform any of the methods described further herein Computing device or equipment 150 may include user interface 150i, e.g. such as present in a smartphone, an automotive information device, or of some other type device, for use by pedestrians, vehicle drivers, passengers, traffic managers, and possibly other people.

Figures 3, 3A:
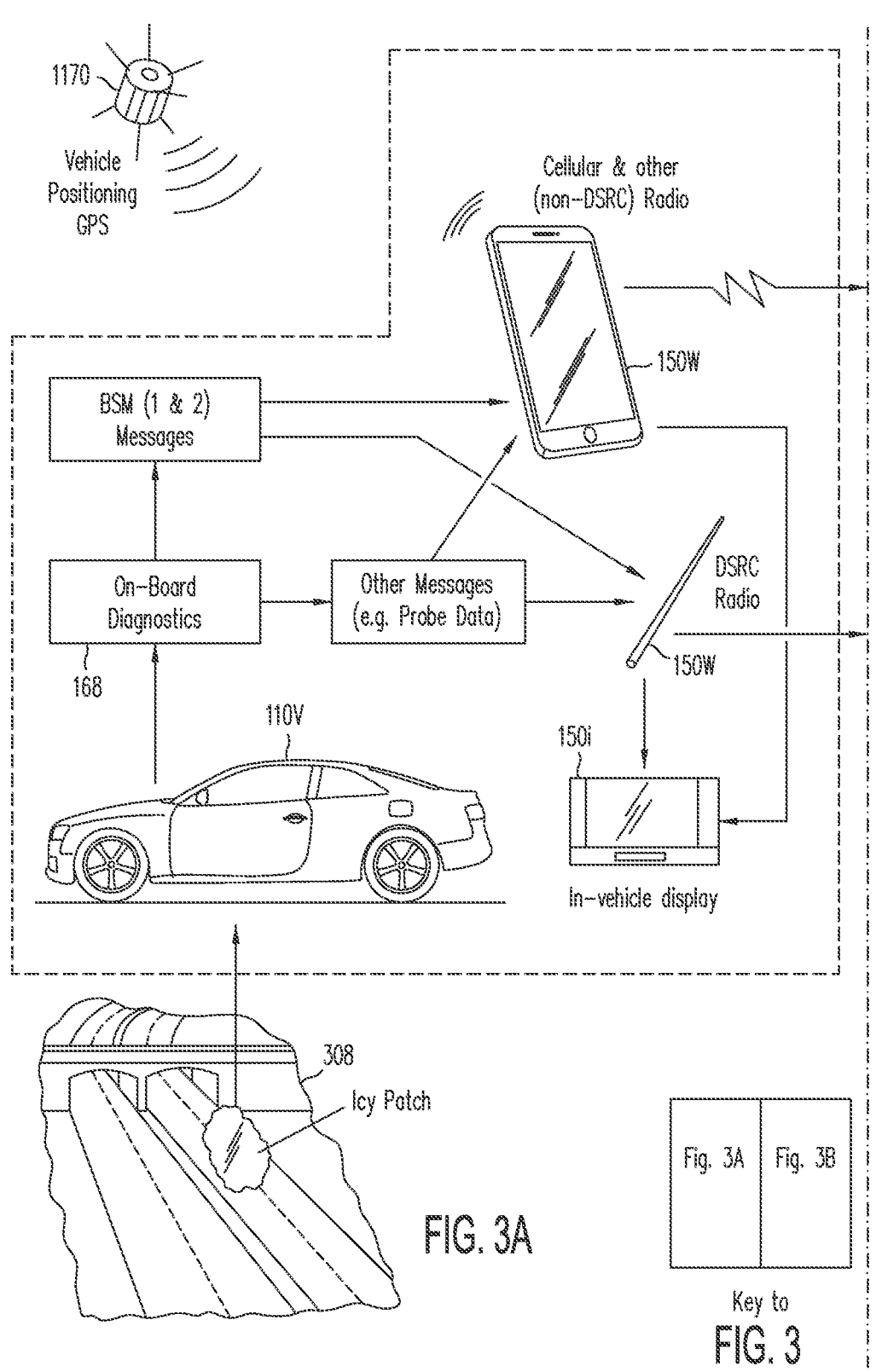
FIGS. 3A and 3B are a representation of communications among vehicles and other equipment in the example environment.
Figure 3B:
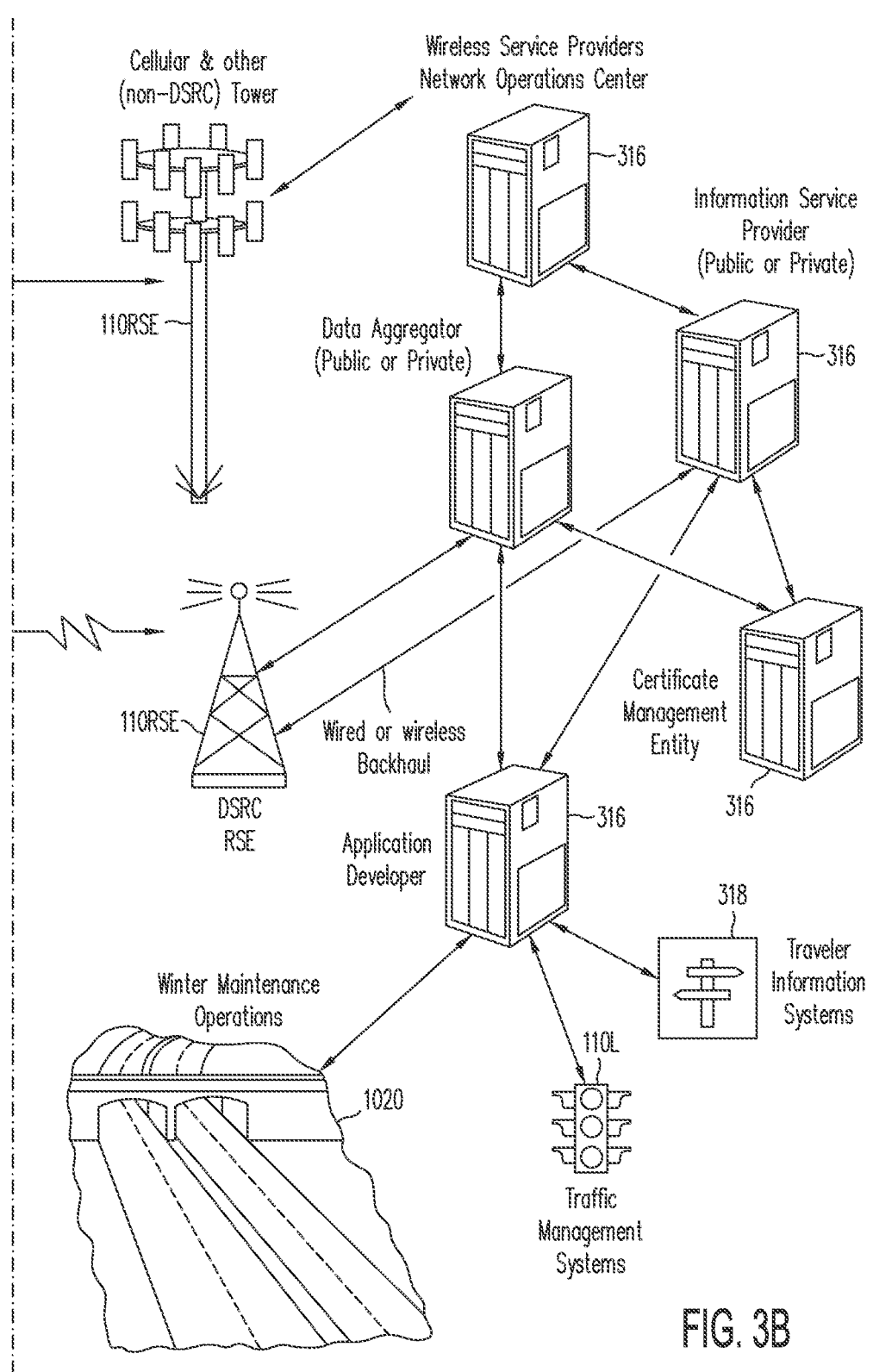

FIGS. 3A and 3B, which together make up FIG. 3, illustrate examples of communication schemes for entities or objects 110 or their computing devices 150 ("object 110", "user 110", and "equipment 150" may be used interchangeably herein when no confusion arises), interacting via V2X or connected vehicle technology. At a scene 308, a vehicle 110V encounters an icy road patch.

The vehicle 110V includes On Board Equipment (OBE) 304 with one or more sensors—such as accelerometers, brake monitors, object detectors, LIDAR, etc.—for sensing conditions within and around vehicles 110V, such as sudden breaking, wheel spin, potential collisions, etc. Using these sensors, the vehicle 110V may, for example, detect the icy road patch at scene 308. The sensors supply information to the OBE's computing device or equipment 150 (FIG. 2) so that it can take action accordingly, e.g., by automatically applying brakes, adjusting steering, and/or notifying the user via a display 150i in case the user needs to react. The computing device 150 may comprise an on-board diagnostics module 168 for performing diagnostics or analysis, for example, on the information provided by the sensors.

Different pieces of equipment on the vehicle 110V communicate by exchanging Basic Safety Messages (BSM) and/or other messages with each other and other vehicles. The BSM messages are described in detail in Whyte et al., "A security credential management system for V2V communications," *IEEE Vehicular Networking Conference,* 2013, pp. 1-8, and CAMP, "Security credential management system proof-of-concept implementation—EE requirements and specifications supporting SCMS software release 1.1," Vehicle Safety Communications Consortium, Tech. Rep., May 2016 (available: https:/www.its.dot.gov/pilots/pdf/SCMS_POC_EE_Requirements.pdf), both of which are incorporated by reference.

A vehicle or other object 110 can obtain its location, for example, by using GPS satellites 1170 or cellular triangulation. The vehicle 110V may also include communication equipment 150W, which, in some embodiments, can include a Direct Short Range Communications (DSRC) radio and non-DSRC radio equipment such as a mobile phone. The vehicle may thus communicate through a cellular system or other road side equipment (RSE) 110RSE directly, i.e., without intermediate network switches. The RSE may act like a gateway to other networks, e.g., the Internet. Using the communication equipment 150W, vehicle 110 can communicate BSM messages and other information to other vehicles, entities, or objects 110 in the V2X or connected vehicle environment. Thus, vehicle 110V/150 may inform the other parts of the environment of the icy patch at scene 308. Likewise, another vehicle 110 may be located in a scene 1020, and may alert other vehicles of winter maintenance operations at that scene.

A traffic management system 110L may comprise equipment—e.g., stoplights, crosswalk lights, etc. located in or near roads, highways, crosswalks, etc.—to manage or control traffic of vehicles, persons, or other objects and entities. Traffic management system 110L may include some of the same or similar equipment as vehicle 110V, including computing devices 150, sensors, user interfaces, communication equipment, etc.

Computer systems 316 process, aggregate, generate, or otherwise operate on information sent to or received from vehicles 110V, traffic management systems 110L, and other objects or entities 110 in the V2X or connected vehicle technology environment, along with their respective computing devices 150. Also shown is a traveler information system 318. Computer systems 316 in can be implemented or incorporate, for example, one or more servers. These computer systems 316, for example, provide or support location and map information, driving instructions, traffic alerts and warnings, information about roadside services (e.g., gas stations, restaurants, hotels, etc.). The computer systems 316 may receive information from the various vehicles, entities, and objects 110 in the environment, process the same, and communicate information or instructions throughout the environment in order to manage the objects, e.g., by adjusting signaling on traffic lights, rerouting traffic, posting alerts or warnings, etc.

This communication capability within the connected vehicle or V2X technology environment is potentially vulnerable to errors and abuse. A malicious user 110 (e.g., a vehicle operator or traffic manager) and/or defective equipment 150 may transmit false or incorrect information to other vehicles, so as to undesirably affect traffic. To protect from such misbehavior, the communications should be authenticated, for example, using a public key infrastructure (PKI). Each vehicle 110V or other equipment is provided with a private key (e.g., for signing a message) and a public key (e.g., for signature verification). The public key is distributed to the public, but the private key is kept secret.

Figures 4, 5A, 5B:
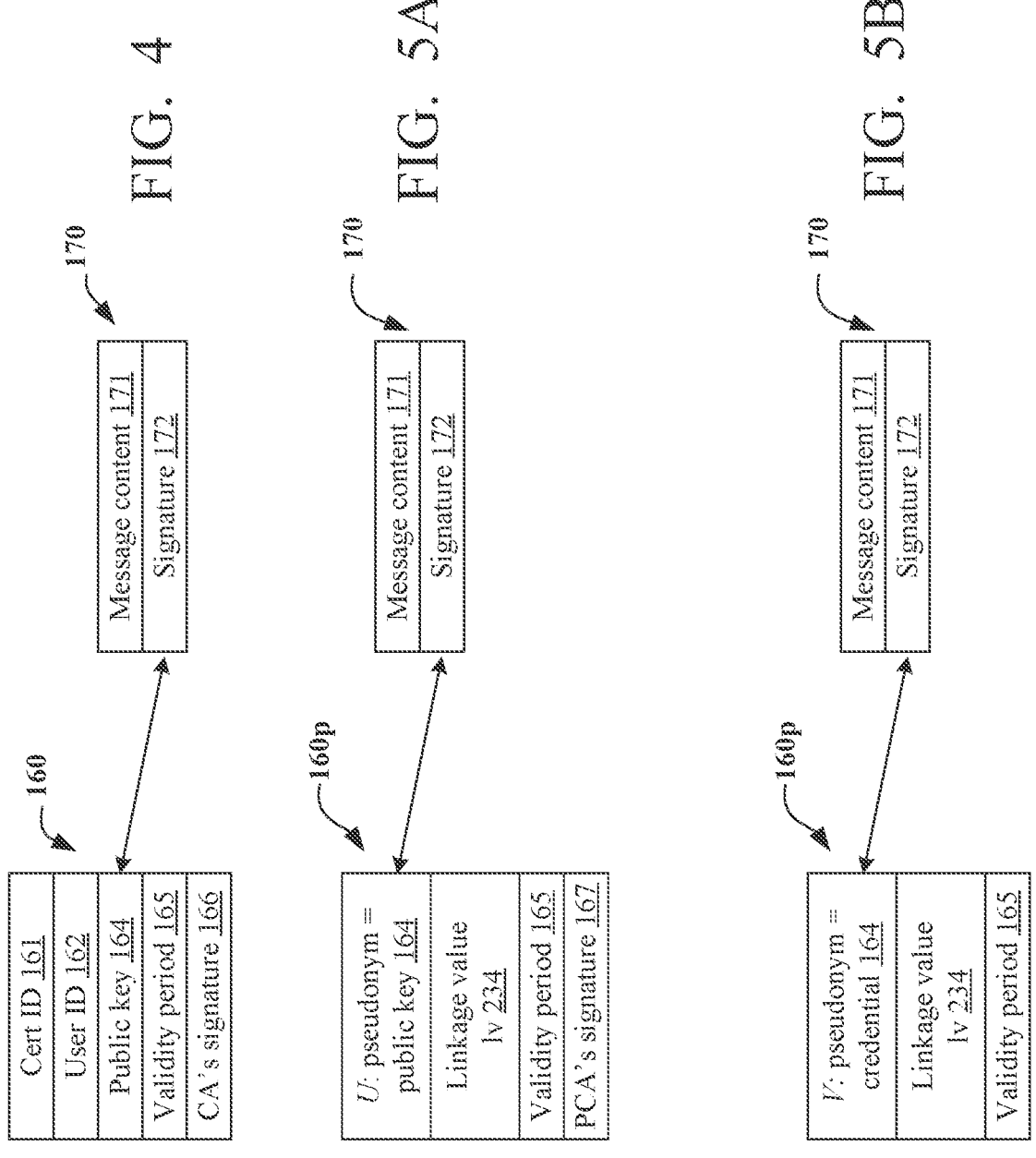
FIGS. 4, 5A, and 5B illustrate examples of digital certificates for message authentication.

FIGS. 4, 5A, and 5B illustrate examples of digital certificates which can be used for message authentication in the connected vehicle or V2X technology environment. Referring to FIG. 4, a digital certificate 160 is shown.

Digital certificate 160 has a number of fields or parameters. In some embodiments, these include a certificate ID 161, a user ID 162 (e.g., a vehicle ID number or the user's email address), the vehicle's (or user's) public key 164, and possibly other parameters (called metadata), such as the certificate's validity period 165, an identification of the signature scheme, and maybe others. Certificate 160 also includes a signature 166 formed by a certificate authority (CA) over all the fields of the certificate except the signature itself. The CA may reside on or be implemented in computers 316 for example.

Digital certificate 160 can be issued to a vehicle 110V to authenticate the public key 164. The vehicle 110V attaches its certificate 160 to each message 170 transmitted by the vehicle. The message 170 includes message body or content 171, and a digital signature 172 generated by the vehicle using its private key. The message recipient uses the CA's public key to verify the signature 166 and thus authenticate the certificate 160 including the public key 164. The recipient then uses the public key 164 to verify the message signature 172 and thus authenticate the message. In some embodiments, the verification of the certificate's signature 166 and message signature 172 can also be combined (e.g., for better performance).

If the vehicle misbehaves (maliciously or due to a malfunction), its certificate 160 can be revoked. Also, the CA will not issue a new certificate for use after the expiration of the revoked certificate's validity period 165.

A disadvantage of this scheme is potentially compromising user privacy: if a vehicle's transmissions are intercepted, the vehicle can be tracked by tracking the certificate ID 161 or user ID 162 transmitted by the vehicle. To protect user privacy, the user can be issued multiple pseudonym certificates 160p (FIG. 5A) with random-looking strings ("pseudonyms") 164 instead of IDs 161 and 162. The vehicle then uses a pseudonym certificate instead of certificate 160 in message transmissions. The vehicle can automatically use different pseudonym certificates 160p for different messages 170 to avoid tracking.

FIG. 5A illustrates a pseudonym certificate 160p accompanying a message 170. The certificate is generated by a pseudonym certificate authority (PCA). The pseudonym 164, also denoted as U, acts as both the certificate ID and the public key. The certificate 160p may include validity period 165, an identification of the signature scheme, PCA signature 167, and maybe other parameters, similarly to certificate 160 of FIG. 4. Pseudonym certificate 160p also includes linkage value (lv) 234 used for certificate revocation as described below. (The linkage values may or may not be used for some embodiments of the present invention.)

The vehicle attaches one of its pseudonym certificates 160p to each message 170 transmitted by the vehicle. The message recipient uses the PCA's public key to verify the PCA signature 167, and uses the pseudonym 164 to verify the message signature 172 and thus authenticate the message 170. In some embodiments, the verification of the certificate's signature 167 and message signature 172 can be combined (e.g., for better performance). Such pseudonym certificates are used in Security Credential Management System (SCMS), originally proposed in Whyte et al., and later extended in CAMP.

In a variation called "implicit certificate" (FIG. 5B), instead of a public key U, the pseudonym field 164 is "credential" data (or "public key reconstruction" data), denoted as V, allowing anyone having the PCA's public key to derive the certificate's public key U. (U is not stored in the certificate 160p.) See for example "Certicom. Sec 4 v1.0: Elliptic curve Qu-Vanstone implicit certificate scheme (ECQV). Technical report, Certicom Research, 2013. http://www.secg.org/sec4-1.0.pdf, ("Certicom" below), incorporated herein by reference.

When a message recipient needs to verify the message signature 172, the message recipient first reconstructs the user's public key U from the pseudonym 164 (V) and the PCA public key, and then uses the user's public key U to verify the signature. Since this process uses the PCA public key, this process not only authenticates the message 170 as coming from a user possessing the certificate 160p, but also verifies the certificate 160p as authenticated by PCA 210. A separate PCA signature 167 is therefore unnecessary and is omitted, reducing the certificate size. See Certicom.

Certificate Revocation

As noted above, when a vehicle misbehaves (due to malice or malfunction), its certificates may have to be revoked. Revocation can be achieved by distributing a list of revoked pseudonym certificates ("Certificate Revocation List", or CRL) to potential recipients of the vehicle's messages. A CRL can be large if the number of revoked vehicles is large. A large CRL takes much memory, network bandwidth, and searching time to determine if a given certificate is in the CRL. Also, a potential recipient device may be hard to reach, e.g. if it is powered down or is out of the network coverage area. Therefore, the CRL size should preferably be reduced.

For efficiency and reliability reasons, it is desirable to generate the pseudonym certificates in large batches, and to distribute the certificates to the vehicles well in advance of the certificates' validity periods 165. However, this policy potentially increases the CRL size because if a vehicle is misbehaving then the CRL may have to include the vehicle's certificates that have been issued to the vehicle but have not become valid yet. This can be avoided if the certificates are distributed "just-in-time", i.e. right before the certificate's validity period 165.

Another way to limit the CRL size is the Issue First Activate Later (IFAL) scheme, described in the E. Verheul reference cited above. In IFAL, large batches of pseudonym certificates are generated and provided to the vehicles in advance, but the certificates are unusable until activated with activation codes. The activation codes are small, and are provided to the vehicles "just in time", i.e. right before each certificate's validity period 165. A separate activation code is generated for each validity period 165, and is valid for all the certificates having the same validity period. Only "honest" (not misbehaving) devices 110 receive the activation code.

This approach obliges vehicles to periodically contact the V2X infrastructure in order to obtain the activation codes, but since activation codes can be very small, this process can be less cumbersome than the "just-in-time" delivery of small batches of certificates immediately before their corresponding validity periods. However, since an activation code can be used with any certificate for the corresponding activation period, the activation code must be distributed over a secure communication channel to be unavailable to revoked certificate holders.

Another problem in any pseudonym certificate infrastructure is potential comprise of the certificate authority (CA) that issues pseudonym certificates: even without colluding with any other entity, in IFAL the CA can link the pseudonym certificates to the corresponding device (to the corresponding device's enrollment certificate provided to the CA); therefore, the users' privacy depends on that CA's willingness to delete the linking information.

One technique that addresses some of the problems noted above is Binary Hash Tree based Certificate Access Management (BCAM) described in Kumar et al. Like IFAL, the BCAM scheme distributes pertinent data, called device specific values (DSVs), "just in time" to allow the vehicles to activate the certificates distributed in advance. But in contrast to IFAL, BCAM's DSVs depend not only on the certificates' validity periods 165 but also on the associated vehicles' IDs. A DSV for any vehicle cannot activate a certificate for any other vehicle, so the DSVs of the honest vehicles can be broadcast over insecure channels and cached by any device to facilitate their subsequent distribution. Also, while generating a separate DSV for each vehicle increases the computational and networking costs, the DSVs can be compressed using a hash tree.

Further, BCAM was designed to interoperate with the SCMS architecture, inheriting SCMS ability to protect the privacy of honest users against a dishonest CA or any other non-colluding system entities.

More particularly, the BCAM's DSVs are small pieces of information that are broadcast by a Certificate Access Manager (CAM). Each batch of certificates issued to a given vehicle is encrypted by CAM, and the decryption key can be computed by the vehicle from the DSV generated by the CAM from the vehicle's ID. Further, the DSVs of the honest vehicles can be compressed using the binary hash tree. If all the vehicles are honest, then CAM can broadcast only the tree's root to allow all the vehicles to decrypt the corresponding pseudonym certificates.

A separate tree is created for each validity period. To revoke a misbehaving vehicle for a given validity period, the CAM will not transmit the tree nodes that would allow the misbehaving vehicle's DSV computation.

To compare with the original SCMS, BCAM creates a highly efficient revocation process, but also creates an extra point of collusion: CAM learns which batch of (encrypted) certificates belong to a same vehicle, so CAM can collude with the CA ("Pseudonym CA", or "PCA") to link those certificates together when they are used by the vehicle. In addition, in the certificate issuance process, the PCA encrypts the certificates to hide them from another SCMS entity (Registration Authority or RA), and then CAM encrypts the certificates again to prevent their activation without the DSV. This double encryption increases the computation costs and the network bandwidth utilization (due to increased number of transmissions for doubly encrypting certificates versus a single encryption at the PCA).

In some embodiments of the present disclosure, the two encryptions are replaced by one. Specifically, the CAM does not encrypt the certificate. Rather, CAM uses the DSV to generate a blinded activation code. The blinded activation code is used by the RA to generate encryption values given to the PCA to encrypt the certificate. The DSV will later be used to activate the certificate, i.e. the DSV will act as an (un-blinded) activation code. The DSV is thus a Device Specific Activation Code (DSAC). But the PCA does not know the DSV nor the blinded activation code, and the PCA cannot recover the DSV from the encryption values, nor link the different encryption values for a given vehicle to each other. On the other hand, CAM does not know the encryption values, and cannot link them to a vehicle or a DSV or a blinded activation code even if CAM and PCA collude. This scheme makes it harder for the PCA and CAM to link pseudonym certificates to a vehicle or to each other even if the PCA and CAM collude.

Some embodiments of the present disclosure can be used with another system, called eSCMS, proposed by the authors of this document, that improves the pseudonym provisioning process by unifying the generation of butterfly keys for encryption and signature. eSCMS is described in U.S. patent application Ser. No. 16/165,871, filed 19 Oct. 2018, incorporated herein by reference.

We will now describe pertinent SCMS features. The invention is not limited to SCMS or eSCMS however.

Security Credential Management System (SCMS)

Security Credential Management System (SCMS) is one of the most prominent among the various pseudonym-based security solutions for V2X. SCMS was originally proposed in W. Whyte, A. Weimerskirch, V. Kumar, and T. Hehn, "A security credential management system for V2V communications," in IEEE Vehicular Networking Conference, 2013, pp. 1-8, incorporated herein by reference. SCMS was later extended in CAMP, "Security credential management system proof-of-concept implementation—EE requirements and specifications supporting SCMS software release 1.1," Vehicle Safety Communications Consortium, Tech. Rep., May 2016. [Online]; available: https://www.its.dot.gov/pilots/pdf/SCMS_POC_EE_Requirements.pdf; incorporated herein by reference. SCMS is presently considered one of the leading vehicular public-key infrastructure (VPKI) candidate designs for protecting V2X—vehicle-to-vehicle (V2V) and vehicle-to-infrastructure (V2I)—communications in the United States. SCMS deals with revocable privacy while preventing any given certificate management entity from tracking devices 110/150 by the entity itself, i.e., without colluding with other system entities. By doing so, SCMS copes with security needs of V2X while elegantly addressing a threat model in which the system's entities can be considered "honest-but-curious," i.e., they follow the correct protocols but may try to track vehicles if this can be done in an undetectable manner, as described in Khodaei et al., "The key to intelligent transportation: Identity and credential management in vehicular communication systems," *IEEE Vehicular Technology Magazine*, vol. 10, no. 4, pp. 63-69, December 2015, which is incorporated by reference. This is accomplished by combining (A) an efficient and privacy-preserving method for vehicles to obtain large batches of pseudonym certificates, and (B) an ancillary process for revoking the user's privacy in case of misbehavior, so multiple certificates belonging to a same user can be easily linked together.

The description below is structured as follows. We start by introducing our notation. Then we give an overview of SCMS, focusing on its procedure for creating and delivering batches of pseudonym certificates (the so-called "butterfly key expansion"). The discussion is mostly based on the description given in W. Whyte, A. Weimerskirch et al. Nevertheless, some embodiments are pertinent to CAMP, and when pertinent we mention where modifications were done by CAMP.

General Notation

For convenience, the "Symbols" Table below includes a list of the symbols and general notation adopted in this disclosure for the relevant environment including V2X, connected vehicle, and/or SCMS.

TABLE

| Symbols | |
| --- | --- |
| Symbol | Meaning |
| U | A vehicle's public key, different for each pseudonym certificate, and used as a pseudonym, placed in pseudonym a certificate |
| U | The private key corresponding to U |
| s, S | Private and public caterpillar keys for signature |
| e, E | Private and public caterpillar keys for encryption |
| $\hat{s}, \hat{S}$ | Private and public cocoon keys for signature |
| $\hat{e}, \hat{E}$ | Private and public cocoon keys for encryption |
| x, X | Private and public unified caterpillar keys |
| $\hat{x}, \hat{X}$ | Private and public unified cocoon keys |
| β | Number of cocoon keys in a batch of pseudonym certificates generated in response to a request to generate the pseudonym certificates |
| la_id | ID of a Linkage Authority |
| l | Number of LAs (typically two) |
| $ls_i$ | Linkage seed |
| $plv_i$ | Pre-linkage value |
| σ | Number of certificates valid in each time period |
| lv | Linkage value |
| Dec(K, str) | Decryption of bitstring str with key K |
| Sign(K, str) | Signature of bits tring str with key K |
| Verif(K, str) | Verification of signature on str with key K |
| Enc(key, str) | Encryption of a bit string str with key key |
| Hash(str) | Hash of str |
| $b^n$ | Bitstring corresponding to the bit b repeated n times |
| \|str\| | The length of str, in bits |
| $str_1 \| str_2$ | Concatenation of bitstrings $str_1$ and $str_2$ |

The notation enc(key, str) denotes the encryption of a bit string str with key key. An example encryption technique uses standard block ciphers such as the Advanced Encryption Standard (AES), as described in more detail in NIST, *Federal Information Processing Standard (FIPS* 197)— *Advanced Encryption Standard (AES)*, National Institute of Standards and Technology, U.S. Department of Commerce, Gaithersburg, MD, USA, November 2001, available: http:// csrc.nist.gov/publications/fips/fips197/fips-197.pdf. Similarly, the notation hash(str) denotes the hash of str, using some standard hash function such as SHA-2 or SHA-3, as described in more detail in NIST, *Federal Information Processing Standard (FIPS* 180-4)—*Secure Hash Standard (SHS)*, National Institute of Standards and Technology, U.S. Department of Commerce, Gaithersburg, MD, USA, August 2015, DOI:10.6028/NIST.FIPS.180-4, and NIST, *Federal Information Processing Standard (FIPS* 202)—*SHA-3 Standard: Permutation-Based Hash and Extendable-Output Functions*, National Institute of Standards and Technology, U.S. Department of Commerce, Gaithersburg, MD, USA, August 2015, DOI: 10.6028/NIST.FIPS.202, both of which are incorporated by reference herein.

The length of a given string str in bytes is denoted |str|. We denote by G the generator point of an elliptic curve group (written additively). In some public key cryptographic algorithms, the private key is an integer k, and the corresponding private key is k·G, as common in cryptosystems based on the Diffie-Hellman paradigm.

In SCMS, each device ($110/150$) receives two types of certificates: an enrollment certificate 160, which has a long expiration time T and identifies a valid device in the system; and multiple pseudonym certificates 160*p*, each having a short validity (e.g., a few days), in such a manner that σ≥1 pseudonym certificates may be valid simultaneously. For protecting its privacy, a particular vehicle may frequently change the pseudonym certificate employed in the vehicle's communications, thus avoiding tracking by nearby vehicles or by roadside units. In practice, it is useful to limit the value of σ to a small number to avoid "sybil-like" attacks (as described in detail in Douceur, "The Sybil attack," *Proceedings of* 1*st International Workshop on Peer-to-Peer Systems (IPTPS)*. Springer, January 2002 (Available: https://www-.microsoft.com/en-us/research/publication/the-sybil-attack/), which is incorporated herein by reference), in which one vehicle poses as a platoon aiming to gain some advantage over the system (see Moalla et al., "Risk analysis study of ITS communication architecture," 3*rd International Conference and The Network of the Future*, 2012, pp. 2036-2040, which is incorporated herein by reference). For example, such a fake platoon could end up receiving preferential treatment from traffic lights programmed to give higher priority to congested roads.

Example SCMS Architecture

Figure 6:
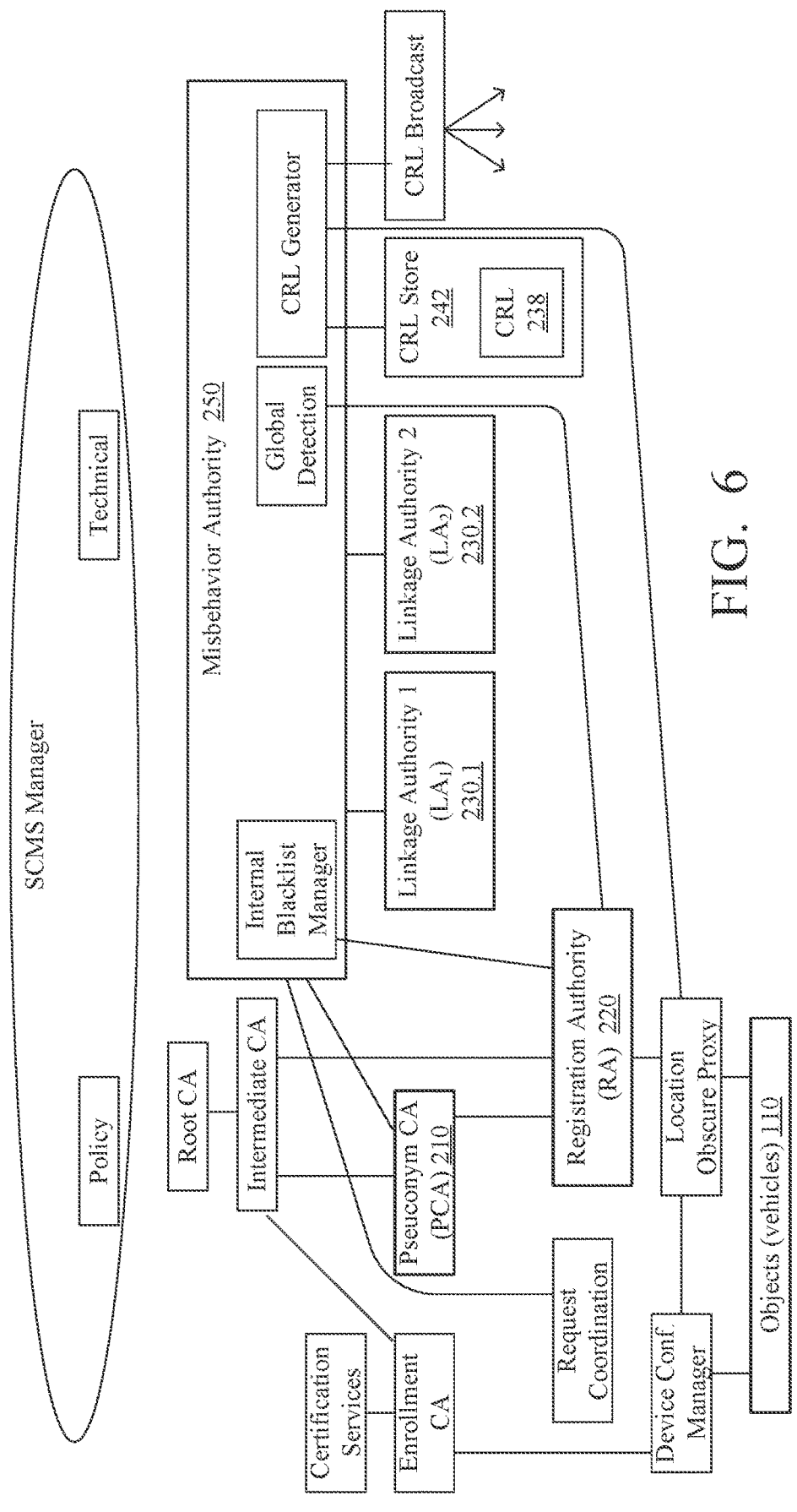
FIG. 6 is a block diagram illustrating computer system architecture suitable for digital certificate management.

FIG. 6 illustrates an exemplary computer system architecture environment for SCMS. SCMS was designed to allow the distribution of multiple pseudonym certificates to vehicles in an efficient manner, while providing mechanisms for easily revoking them in case of misbehavior by their owners.

In SCMS, a Registration Authority (RA) 220 provides batches of pseudonym certificates 160*p* to authorized vehicles or objects 110/150. A batch is generated from a single request received from a vehicle, in the butterfly key expansion process. RA 220 validates the vehicle requests by the vehicles' enrollment certificates 160. In addition to an enrollment certificate, each request includes some public keys (other than 164) generated by the vehicle for the pseudonym certificate provisioning process. These public keys are labeled as 710 in FIG. 7 discussed below. RA 220 then shuffles together the keys 710 belonging to different users before individually sending them to a Pseudonym Certificate Authority (PCA) 210. As such, the PCA 210 cannot link a group of requests to a same object 110/device 150. The PCA 210, in turn, creates valid certificates 160*p*, and encrypts and signs them before delivering them to the RA for forwarding to the devices 110/150. Since the certificates 160*p* are encrypted, the RA cannot link a pseudonym certificate 160*p* to a device 110/150. Unless the PCA and RA collude, they are unable to link a certificate 160*p* to its owner 110/150.

Linkage Authority (LA) 230, or rather linkage authorities $LA_1$ and $LA_2$—also labeled as 230.1 and 230.2—generate random-like bitstrings that are combined to create a linkage value (lv 234 in FIGS. 5A, 5B) added to pseudonym certificates 160*p* so that the pseudonym certificates can be efficiently revoked. The lv values are different for different pseudonym certificates, but they can be linked together for a given enrollment certificate 160. See e.g. U.S. patent application No. 62/561,667, filed 21 Sep. 2017, incorporated herein by reference; U.S. patent application Ser. No. 16/136, 621, filed 20 Sep. 2018, incorporated herein by reference; and Marcos A. Simplicio Jr. et al., "A privacy-preserving method for temporarily linking/revoking pseudonym certificates in vehicular networks", https://eprint.iacr.org/2018/ 185.pdf, 2018, incorporated herein by reference.

Misbehavior Authority (MA) 250 obtains a misbehaving device's certificate 160*p* and uses the certificate's lv 234 and data obtained from the RA and PCA to revoke all of the same device's certificates 160*p*.

In some embodiments, each of RA 220, PCA 210, LAs 230, and MA 250 can be implemented with or incorporate one or more computing devices (e.g., computing device 150 or computer systems 316).

SCMS's Butterfly Key Expansion

Figure 7:
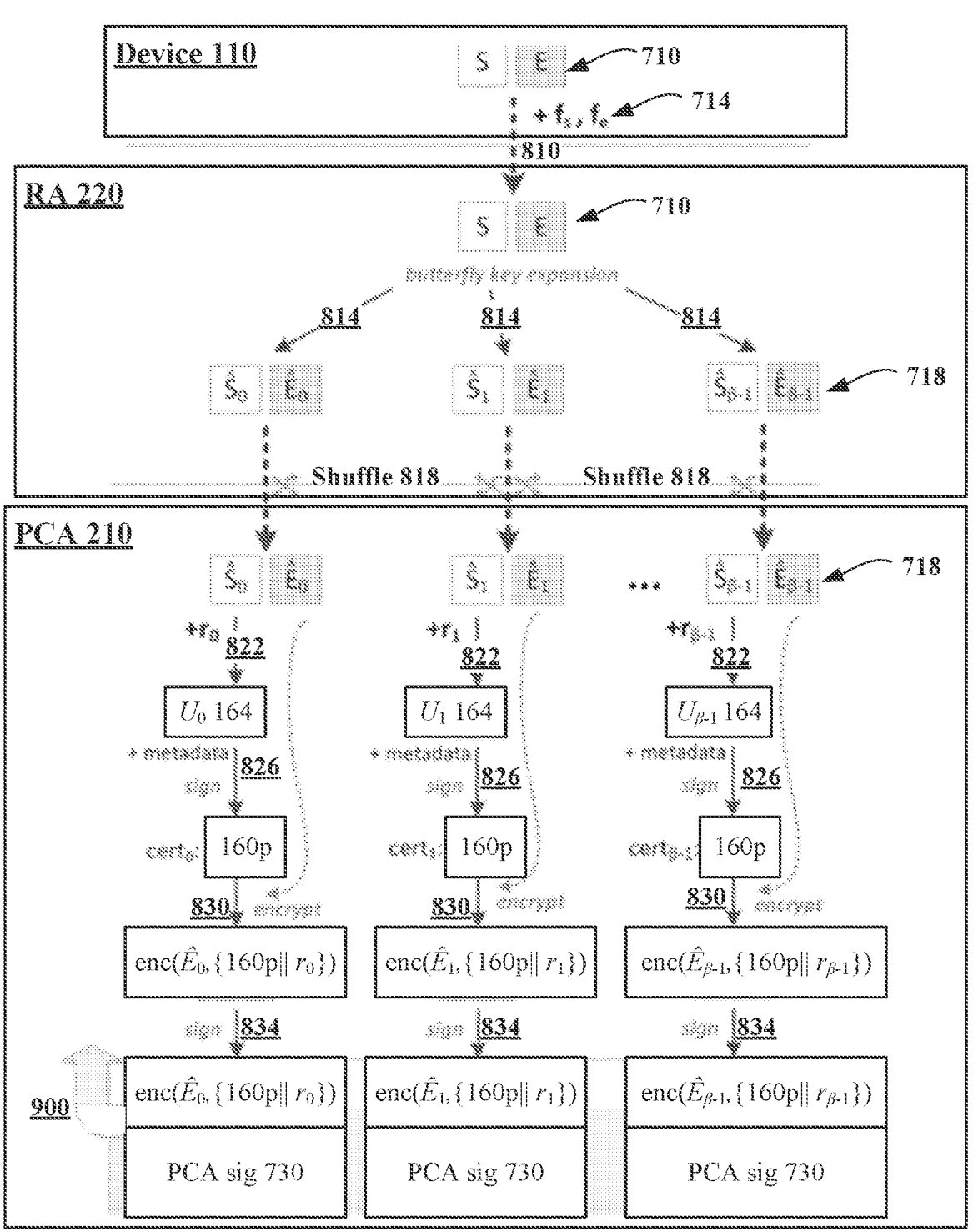
FIGS. 7 and 8 are flowcharts that illustrate prior art processes for generating digital certificates.

The pseudonym certification provisioning process in SMCS provides an efficient mechanism for devices 110 to obtain arbitrarily large batches of (short-lived) certificates 160*p* with a small-sized request message. The process is illustrated in FIG. 7. First, the requesting device 110/150 generates two "caterpillar" private/public key pairs 710:

$$(s,S=s\cdot G) \text{ and } (e,E=e\cdot G)$$

The private keys s and e should be random. The keys are generated using elliptic curve cryptography. The keys (s,S) relate to generation of pseudonyms 164 (FIGS. 5A, 5B), and are called "signature keys" because the pseudonyms 164 are used for message authentication via signature verification as described above. The keys (e,E) relate to pseudonym certificate encryption performed to hide the pseudonyms from the RA as described below; these keys are called "encryption keys".

At step 810, the device 110 requests the RA to generate some predefined number β of pseudonym certificates 160*p*. The request sent to the RA includes the public caterpillar keys S and E, shown at 710. In addition to keys 710, the request includes data defining two suitable pseudorandom functions (PRF) 714, denoted $f_s$ and $f_e$. (In some embodiments, the function-defining data may be the seeds of these functions; the functions' outputs can be computed from the seeds. Alternatively, while less efficient, the function-defining data may include the entire description of the PRFs, including the description of the computational algorithms for the PRFs.)

The RA may receive such requests from different devices 110, and obtains β pseudonym certificates 160*p* for each device as follows. For each request, the corresponding keys S and E are employed by the RA, at step 814, for generating public cocoon keys 718. Specifically, at step 814, the key S is used in the generation of β public cocoon signature keys:

$$\hat{S}_i = S + f_s(i) \cdot G$$

for all i such that 0≤i<β. Similarly, at the same step 814, the RA uses the key E for generating β public cocoon encryption keys:

$$\hat{E}_i = E + f_e(i) \cdot G$$

Pairs of cocoon keys 718, i.e. $(\hat{S}_i, \hat{E}_1)$, from different devices 110 are then shuffled together by RA 220 (step 818) and sent individually or in batch to PCA 210 for the generation of the corresponding pseudonym certificates 160*p*. Each pair of cocoon keys is accompanied by the corresponding metadata, such as validity period 165 and data required for computation of linkage value (lv) 234; see FIGS. 4, 5A, 5B.

Figure 8:
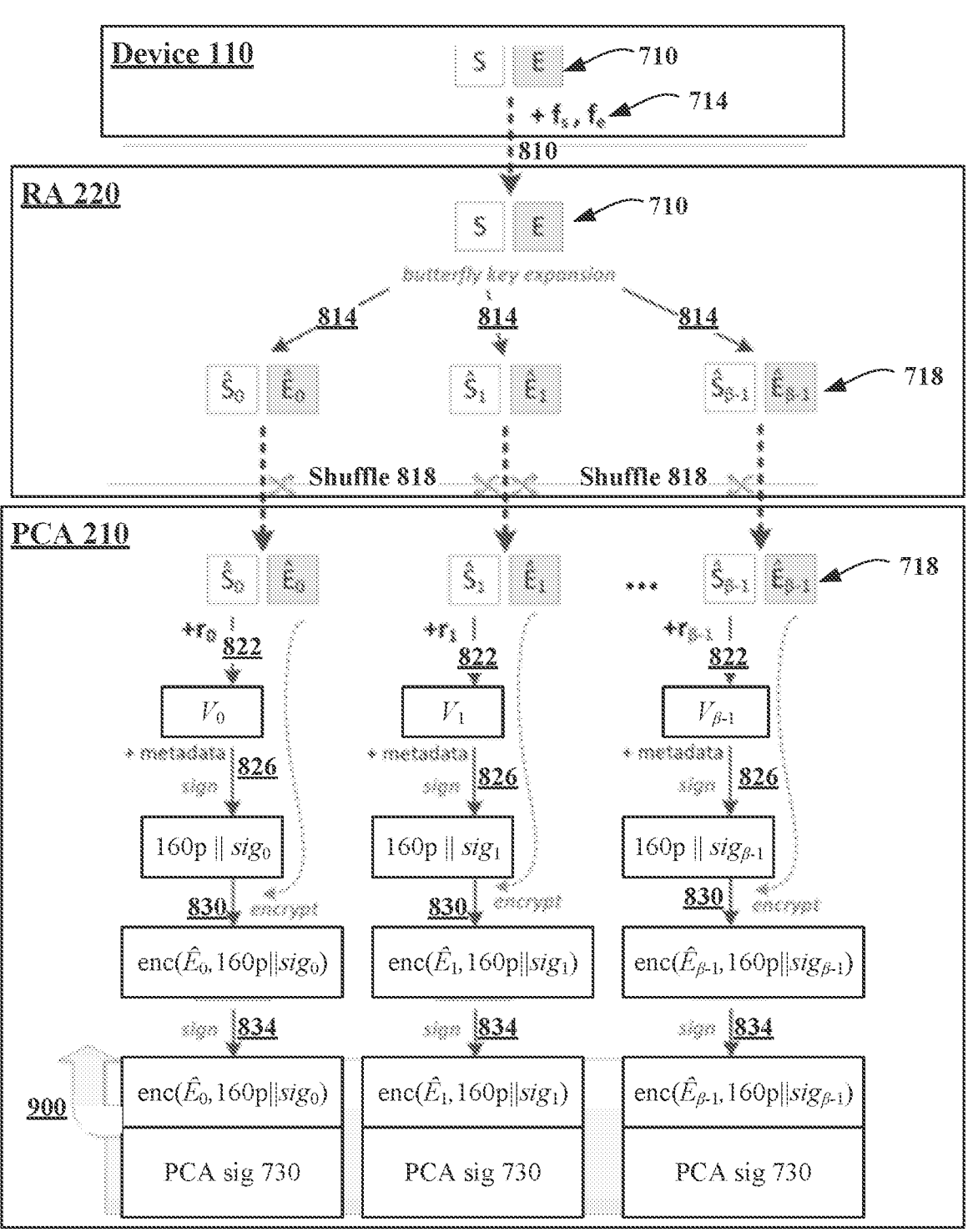

For each pair of cocoon keys $(\hat{S}_i, \hat{E}_i)$, the PCA can either create an explicit pseudonym certificate 160*p* (FIG. 5A) using the method of FIG. 7, or engage in an implicit certification process (FIG. 5B and Certicom) as illustrated in FIG. 8. The explicit or implicit certificate 160*p* is encrypted by the PCA and sent to the RA (step 900 in FIGS. 7, 8)). The RA "un-shuffles" the pseudonym certificates, and sends each pseudonym certificate to the corresponding (associated) device 110. Each device's β pseudonym certificates are sent to the device in batch.

For the explicit process (FIGS. 5A, 7), the PCA computes, at step 822, a random value $r_i$ and generates the certificate's public signature key (pseudonym) 164 according to the following equation (Eq. 1):

$$U_i = \hat{S}_i + r_i \cdot G \qquad (Eq. 1)$$

At step 826, the PCA forms the certificate 160*p*, also shown as cert*i*, by: (1) combining $U_i$ with the metadata, e.g. the certificate's validity period 165 and the linkage value (lv) 234; and (2) digitally signing the combination to form the signature 167 (FIG. 5A).

The PCA then encrypts the certificate 160*p* together with the value of $r_i$, using the corresponding cocoon key $\hat{E}_i$ (step 830). The encrypted package (certificate 160*p* and value $r_i$) is signed again by the PCA (step 834) using the PCA's private signature key. The signature is shown at 730.

The result, i.e. the encrypted and signed package, is sent to the RA (step 900). The RA forwards the result to the requesting device 110.

Only the requesting device 110 can decrypt the value:

$$enc(\hat{E}_i, 160p \| r_i)$$

(see step 834) because only the requesting device 110 knows the private key corresponding to the cocoon key $\hat{E}_i$. This private key is given by the following equation (Eq. 2):

$$\hat{e}_i = e + f_e(i) \qquad (Eq. 2)$$

Therefore, only the device 110 can learn the pseudonym $U_i$ (as part of certificate 160*p*) and compute the corresponding private signature key:

$$u_i = s + r_i + f_s(i) \qquad (Eq. 3)$$

The device 110 can also verify the signature keys $u_i$, $U_i$ by checking that:

$$U_i = u_i \cdot G \qquad (Eq. 4)$$

Device 110 also verifies the PCA signature 730 to prevent the Man-in-the-Middle attack by the RA as described below.

For implicit certificates 160*p*, this process is as follows (see FIG. 8). The cocoon key generation (steps 810, 814, 818) is the same as for the explicit certificates. Then at step 822, the PCA computes a random $r_i$, and computes the credential 164:

$$V_i = \hat{S}_i + r_i \cdot G \qquad (Eq. 5)$$

Then at step 826, the PCA creates the implicit certificate 160*p*, also denoted cert*i*, as:

$$cert_i = (V_i, meta)$$

i.e.

$$cert_i = V_i \| meta$$

where "meta" is the metadata (including validity period 165 etc.).

Also at step 826, the PCA signs this certificate to obtain the signature sig*i* as follows:

$$sig_i = h_i \cdot r_i + u_{PCA} \qquad (Eq. 6)$$

where $h_i = Hash(cert_i)$, and $u_{PCA}$ is the PCA's private signature key.

The remaining steps of the certificate generation are similar to FIG. 7. Specifically, the PCA encrypts the certificate 160*p* together with the signature value of sig*i*, using the corresponding cocoon key $\hat{E}_i$ (step 830). The encrypted package (certificate 160*p* and value sig*i*) is signed by the PCA (step 834) using the PCA's private signature key. The signature is shown at 730. At step 900, the result (the encrypted structure and the signature 730) is sent to the requesting device 110 via the RA 220.

The device 110 verifies the PCA signature 730, decrypts the package cert*i*‖sig*i*, and computes:

$$h_i = Hash(cert_i) \qquad (Eq. 7)$$

Device 110 then sets its own private signature key to:

$$u_i = h_i \cdot (s + f_s(i)) + sig_i \qquad (Eq. 8)$$

whereas the corresponding public signature key takes the form:

$$U_i = u_i \cdot G \qquad (Eq. 9)$$

The device 110 can then verify the validity of the public key $U_i$ by ascertaining that $$U_i = h_i \cdot V_i + U_{PCA} \qquad (Eq. 10)$$

where $U_{PCA}$ is the PCA's public signature key corresponding to $u_{PCA}$.

Whichever certificate model is adopted, at step 834 of FIGS. 7 and 8, the encrypted PCA response is signed using the PCA's own private signature key $u_{PCA}$, aiming to prevent an "honest-but-curious" RA from engaging in a Man-in-the-Middle (MitM) attack. Namely, without this signature 730, a MitM attack by the RA could be performed as follows: (1) instead of $\hat{E}_i$, the RA sends to the PCA, at step 818, a fake cocoon encryption key $$\hat{E}_i^* = z \cdot G,$$

for an arbitrary value of z; (2) at step 900, the RA decrypts the PCA's response using z, learning the pseudonym $U_i$ (FIG. 7) or $V_i$ (FIG. 8); and (3) the RA re-encrypts the certificate with the correct $\hat{E}_i$, sending the result to the device, which proceeds with the protocol as usual. But if the PCA generates signature 730 and device 110 verifies the signature 730 on the RA's response, the attack would fail because the RA cannot provide a valid signature 730 for the re-encrypted certificate generated in step (3).

Independently of the type of certificate adopted (explicit or implicit), the user's privacy is protected in this process as long as the RA and PCA do not collude. After all, the shuffling of public cocoon keys performed by the RA (step 818) prevents the PCA from learning whether or not any keys 718 belong to a same device. Unlinkability of public keys $U_i$ (FIG. 7) or $V_i$ (FIG. 8) to the devices for the RA, in turn, is also obtained because the latter does not learn the value of $U_i$ or $V_i$ randomized by the PCA using $r_i$.

Key Linkage

To avoid large certificate revocation lists (CRLs), revocation is done in such a manner that many certificates 160p from a same user can be linked together by inserting only a small amount of information into a CRL. For this purpose, each certificate 160p (FIGS. 4, 5A-B) receives a linkage value lv 234, computed by XORing l prelinkage values $plv_i$ (where $1 \le i \le l$) provided by $l \ge 2$ different Linkage Authorities (LA). The generation of $plv_i$ by $LA_i$ is done upon request by the RA, as follows.

Figure 9:
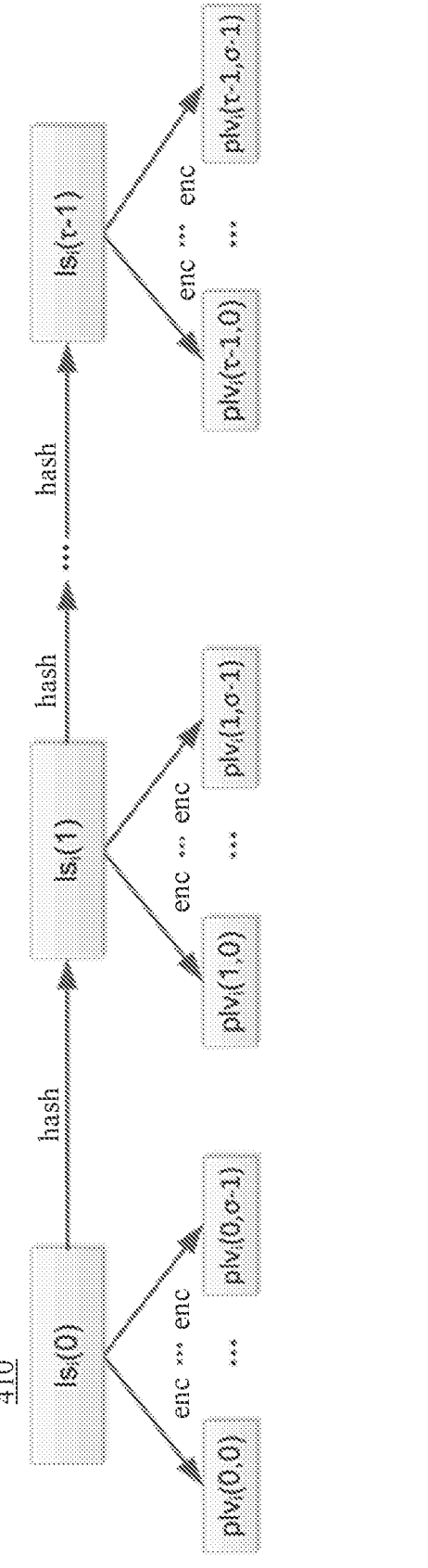
FIG. 9 illustrates a data structure used in certificate revocation schemes according to prior art.

First, as illustrated in FIG. 9, $LA_i$ picks a random, 128-bit linkage seed $ls_i(0)$. Then, if the RA's request covers $\tau$ certificate time periods, $LA_i$ iteratively computes a $\tau$-long hash chain $ls_i(t)=Hash(la\_id_i \| ls_i(t-1))$, where $la\_id_i$ is $LA_i$'s identity string and $1 \le t \le \tau$. See L. Lamport, "Password authentication with insecure communication," Commun. ACM, vol. 24, no. 11, pp. 770-772, 1981, incorporated herein by reference. Each $ls_i(t)$ is then used in the computation of a $\sigma$ pre-linkage values $plv_i(t, c)=Enc(ls_i(t), la\_id_i \| c)$, for $0 \le c < \sigma$. In the CAMP reference cited above, the encryption is actually done using the Davies-Meyer construction; see B. Preneel, Davies-Meyer Hash Function. Boston, MA: Springer US, 2005, pp. 136-136, incorporated herein by reference. In particular, the cipher's input is XORed with the ciphertext produced as output. However, since this small difference is not relevant for our discussion, we omit the extra XOR in our notation. Finally, every $plv_i(t, c)$ is truncated to a suitable length, individually encrypted and authenticated using a key shared between the PCA and $LA_i$, and then sent to the RA. (Even though authentication is not explicitly mentioned in Whyte et al., "A security credential management system for V2V communications," and CAMP, both cited above, authentication is important to prevent the RA from forging its own pre-linkage values and delivering them to the PCA as if they came from LAi, which would allow a dishonest RA to track devices.) The RA simply includes this encrypted information, together with the corresponding cocoon keys, in the requests sent to the PCA, so the latter can compute the linkage values to be included in the resulting certificates. In the usual case, which consists of two LAs participating in this process, the linkage value for the c-th certificate valid in time period t is computed as $lv(t, c)=plv_1(t, c) \oplus plv_2(t, c)$.

As a result of this process, whenever a device is identified as malicious by a Misbehavior Authority (MA), certificates still valid owned by that device can be revoked not only individually, but also altogether. This is accomplished via the collaboration of the PCA, RA, and LAs. Namely, the PCA can associate the lv informed by the MA to the original pseudonym certificate request received from the RA. The PCA then provides this information, together with the corresponding pre-linkage values $plv_i(t, c)$, to the RA. The RA, in turn, can (1) identify the device behind that certificate request, placing its enrollment certificate in a blacklist for preventing it from obtaining new pseudonym certificates, and (2) ask $LA_i$ to identify the linkage seed $ls_i(0)$ from which $plv_i(t, c)$ was computed. Finally, each $LA_i$ provides RA with $ls_i(t_s)$, where $t_s$ is the time period from which the revocation starts being valid (usually, the current time period or the one in which the misbehavior was first detected). The set of $ls_i(t_s)$ received from the LAs can then be placed in a CRL to be distributed throughout the system, allowing any entity to compute $lv(t,c)$ for time periods $t \ge t_s$, linking the corresponding certificates to a single CRL entry. Consequently, current and future certificates owned by the misbehaving device are revoked and can be linked to that device; past certificates remain protected, though, preserving the device's privacy prior to the detection of the malicious activity.

In terms of complexity, this revocation process is such that, if the system involves l linkage authorities 230, each revoked device contributes with l pre-linkage values to the CRL. Hence, the CRL size grows linearly with the number of revoked devices, not with the number of revoked certificates. The main drawback of this gain in size is that checking whether a given certificate is in the CRL requires the verification of every CRL entry against that certificate's linkage value. More precisely, for each CRL entry published at time period $t_s$, the verification of whether it covers a given certificate involves basically the computation of two components:

a) $ls_i(t_c)$: it takes $l \cdot (t_c - t_s)$ hashes to compute $ls_i(t_c)$ from $ls_i(t_s)$, where $1 \le i \le l$ and $t_c$ is the time period when the verification is performed. This cost may be reduced by means of pre-computation, i.e., if the device always keeps the updated version of the linkage seeds, $ls_i(t_c)$, besides the original ones provided in the CRL. Nevertheless, to cope with the lack of a system-wide time synchronization (see Verheul reference), devices may actually need to keep a slightly older linkage seed in memory; for example, by keeping $ls_i(t_c-\epsilon)$ for a small $\epsilon$, it is possible to compute $ls_i(t_c)$ with only $\epsilon$ hashes.

b) $plv_i(t_c, c)$: it takes l encryptions to compute $plv_i(t_c, c)$ from $ls_i(t_c)$ if the value of c for the certificate under verification is known; this is the case, for example, if the value of c is part of that certificate's metadata. Otherwise, the total cost would be up to $l \cdot \sigma$ encryptions, since the certificate under analysis may be any out of a that are valid in the current time period; with enough memory, however, the latency of this process can be reduced via the pre-computation of a look-up table with all a possible entries for each $ls_i(t_c)$ in the CRL. On the one hand, besides providing better performance, the first approach facilitates the construction of solutions resilient to the aforementioned sybil-like attacks; this can be accomplished by counting as valid only messages signed with certificates for a fixed value of c. On the other hand, this ability may also be abused to allow vehicle tracking if one or several applications decide to only accept a specific c; meanwhile, a bit of privacy is lost because different certificates known to have the same value for a are also deemed to belong to different vehicles. Therefore, mandating the disclosure of c in pseudonym certificates is likely to become controversial and, in practice, it would probably be avoided in favor of look-up tables.

All in all, to reduce the costs related to the revocation verification, it is important to limit the total number of entries in the CRLs. Unfortunately, however, since each CRL entry covers τ time periods, they may have to remain in the CRL for quite a long time. To address this issue, some embodiments of the invention hereby proposed and below prevent revoked vehicles' certificates from being activated, so the corresponding entries on the CRL can be removed earlier.

Unified Butterfly Key Expansion Process (eSCMS)

The butterfly key expansion (step 814) originally described in Whyte et al., "A security credential management system for V2V communications", cited above, is executed twice by the RA during the pseudonym certification provisioning process: once for the generation of the public signature keys and another for encryption keys. As a result, the device itself needs to send to the RA two caterpillar keys (S and E), as well as the corresponding PRFs ($f_s$ and $f_e$), for the computation of the corresponding cocoon keys ($\hat{S}_i$ and $\hat{E}_i$, where $0 \le i < \beta$). In addition, since $\hat{S}_i$ and $\hat{E}_i$ are seen as independent keys by the PCA when issuing a certificate, the PCA needs not only to encrypt the certificate but also sign the resulting encrypted package to avoid manipulation by the RA. Even if an efficient signcryption algorithm is employed for this purpose—see e.g. Y. Zheng, "Digital signcryption or how to achieve cost (signature & encryption)<<cost(signature)+cost(encryption)," in Advances in Cryptology—CRYPTO '97: 17th Annual International Cryptology Conference. Berlin, Heidelberg: Springer Berlin Heidelberg, 1997, pp. 165-179, incorporated herein by reference—the extra signature leads to additional overheads: on the PCA, for the computation and transmission of such signature; on the RA, for its reception and re-transmission; and on the end devices, for its reception and verification, besides the verification of the certificate's signature itself.

It turns out, however, that the generation and usage of encryption and signature keys can be done in a unified manner. This leads to better efficiency in terms of processing and bandwidth usage, without loss of security or functionality. This alternate process is part of eSCMS; see PCT patent application no. PCT/US2018/056784, filed Oct. 19, 2018, incorporated herein by reference.

In eSCMS (FIGS. 10A, 10B, 11A, 11B), the generation and usage of the caterpillar keys 710 is done in a unified manner, leading to better efficiency without loss of security or functionality. Specifically, in some embodiments, the device 110 generates only one caterpillar key pair, (x,X) in FIGS. 10AB and 11A-B, instead of two key pairs (e,E) and (s,S). This caterpillar key pair (x,X) can have the same size as any one of (e,E) and (s,S), and is used to generate both the encryption and signature keys. Both the explicit and the implicit certificate models are eSCMS compatible.

Examples of Explicit Certificate Process in eSCMS

Figure 10A:
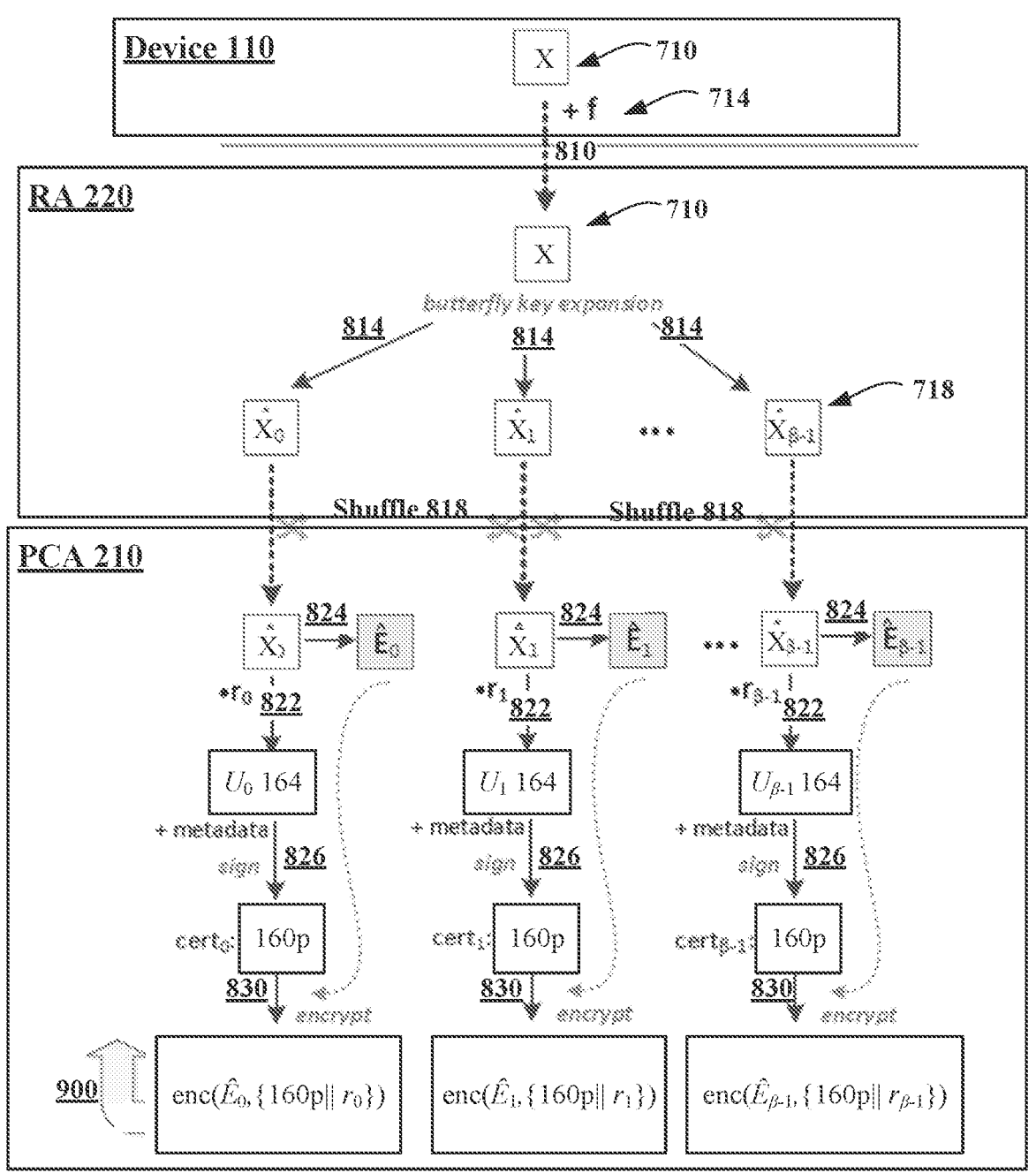

One eSCMS explicit certificate scheme is depicted in FIGS. 10A-B. At step 904, the requesting device 110 generates only a single caterpillar private/public key pair 710: (x, X=x·G). The private key x can be randomly generated. The public key X will be used by the PCA both for encrypting the certificate 160*p* and for creating the public key or pseudonym 164 for the certificate as described below (step 824).

At step 810, the device 110 requests the RA to generate some predefined number β of pseudonym certificates 160*p*. The device request sent by the device to the RA includes a unique ID ("device request ID"), a unique device ID (e.g. VID), the public unified caterpillar key X, and data defining a suitable pseudorandom function (PRF) 714, shown simply as $f$. The function $f$ can be the same as $f_s$ or $f_e$ in SCMS. A copy of each device request is stored by the device in its memory.

At step 814, the RA generates β public unified cocoon signature keys for each device (similarly to SCMS):

$$\hat{X}_i = X + f(i) \cdot G \qquad \text{(Eq. 11)}$$

At step 818, the RA shuffles these cocoon keys for different devices, and for each cocoon key $\hat{X}_i$ the RA sends a request ("RA request") for a pseudonym certificate 160*p* to PCA 210. The RA requests for different devices 110 can be sent to the PCA in batch, but this is not necessary.

For each RA request, the RA generates a unique request ID ("RA request ID"), and creates a data structure ("RA request data structure") containing the RA request ID, the cocoon key index i (see equation (Eq. 11)), and the associated device request. The RA request ID is provided to the PCA with the RA request. Also provided are metadata, e.g. the certificate's validity period 165 and the linkage value (lv) 234. The device ID is not provided to the PCA, so the PCA cannot associate the RA request with the device. Also, the PCA cannot determine whether different RA requests are associated with the same or different devices.

For each cocoon key $\hat{X}_i$, the PCA can either create an explicit or implicit pseudonym certificate 160*p*. FIGS. 10A-B illustrate a process for explicit certificates. In either case, the explicit or implicit certificate 160*p* will later be encrypted by the PCA and sent to the RA (step 900). Each encrypted pseudonym certificate will be accompanied by the RA request ID, allowing the RA to "un-shuffle" the pseudonym certificates, i.e. associate each encrypted package with the device, and send the encrypted package to the associated device. Optionally, each device's β pseudonym certificates can be sent to the device in batch.

For the explicit certificates, at step 822, the PCA generates a random value $r_i$, and generates the certificate's public signature key (pseudonym) 164 as a randomized function of cocoon key $\hat{X}_i$, i.e. as a function of $\hat{X}_i$ and $r_i$. For example, either one of the following equations (Eq. 12), (Eq. 12') can be used:

$$U_i = \hat{X}_i + r_i \cdot G \qquad \text{(Eq. 12)}$$

$$U_i = r_i \cdot \hat{X}_i \qquad \text{(Eq. 12')}$$

Also (step 824), the PCA generates a public cocoon encryption key $\hat{E}_i$. In some embodiments, $\hat{E}_i$ is set equal to $\hat{X}_i$, i.e.

$$\hat{E}_i = \hat{X}_i \qquad \text{(Eq. 13)}$$

Other expressions for $\hat{E}_i$ can also be used. For example:

$$\hat{E}_i = \text{hash}(\hat{X}_i) \cdot G + \hat{X}_i \qquad \text{(Eq. 13')}$$

The remaining steps may or may not be similar to FIG. 7, but generation of the PCA signature 730 can be omitted. Specifically, in some embodiments, at step 826, the PCA forms the certificate 160*p*, also shown as cert$_i$, by: (1) combining $U_i$ with the metadata, e.g. the certificate's validity period 165 and the linkage value (lv) 234; and (2) digitally signing the combination to form the signature 167 (FIG. 5A).

At step 830, the PCA encrypts the package which includes (possibly consists of) the certificate 160*p* and the value $r_i$. The encryption uses the corresponding cocoon key $\hat{E}_i$. An exemplary encryption scheme is ECIES; see IEEE, *IEEE Standard Specifications for Public-Key Cryptography—*

*Amendment* 1: *Additional Techniques*, IEEE Computer Society, 2004, incorporated herein by reference. Other encryption schemes can also be used.

The result, i.e. the encrypted package, is sent to the RA (step 900), together with the RA request ID received by the PCA at step 818. As noted above, signature 730 is omitted. The RA cannot decrypt the package.

The RA "un-shuffles" the data received from the PCA. To perform this operation, the RA matches the RA request ID accompanying each encrypted package with the RA request ID stored in the RA's memory (step 818). The RA forwards to each device 110 the encrypted package for that device (step 910). With each encrypted package, the RA sends to the device the corresponding i value defining the associated cocoon key; see equation (Eq. 11). The RA obtains the i value from the RA request data structure.

At step 914, for each certificate 160*p*, the associated device 110 computes the decryption key $\hat{e}_i$ corresponding to the encryption (cocoon) key $\hat{E}_i$. If $\hat{E}_i$ was set to equal $\hat{X}_i$ (equation (Eq. 13)), then:

$$\hat{e}_i = x + f(i) \tag{Eq. 14}$$

In case of equation (Eq. 13'):

$$\hat{e}_i = \text{hash}(\hat{X}_i) + x + f(i) \tag{Eq. 14'}$$

using the same hash function "hash" as was used in equation (Eq. 13').

The device 110 uses the decryption key $\hat{e}_i$ to decrypt the package, and thus recovers the certificate 160*p* and the corresponding $r_i$. This decryption key works because, in case of equations (Eq. 13), (Eq. 14), the encryption public key is:

$$\hat{E}_i = \hat{X}_i = x \cdot G + f(i) \cdot G$$

In case of equations (Eq. 13'), (Eq. 14'), the decryption works because the encryption public key is:

$$\hat{E}_i = \text{hash}(\hat{X}_i) \cdot G + \hat{X}_i = \text{hash}(\hat{X}_i) \cdot G + x \cdot G + f(i) \cdot G$$

At step 918, the device verifies the PCA signature 167 using the PCA's public signature key $U_{PCA}$.

At step 922, the device computes its private signature key $u_i$ corresponding to $U_i$. If $U_i$ was computed as in equation (Eq. 12), then the private signature key is created as:

$$u_i = r_i + x + f(i) \tag{Eq. 15}$$

If equation (Eq. 12') was used, then the private signature key is created as:

$$u_i = r_i \cdot (x + f(i)) \tag{Eq. 15'}$$

At step 924, the device verifies that $$u_i \cdot G = U_i \tag{Eq. 16}$$

If any of the above checks or verifications fails, the device may reject the certificate 160*p* and/or all the certificates in the batch. The device may also inform pertinent authorities (e.g. misbehaving authority 250) about the error in order to trigger maintenance and/or security operations on malfunctioning or dishonest RA or PCA.

Examples of Implicit Certificate Process in eSCMS

Figure 11A:
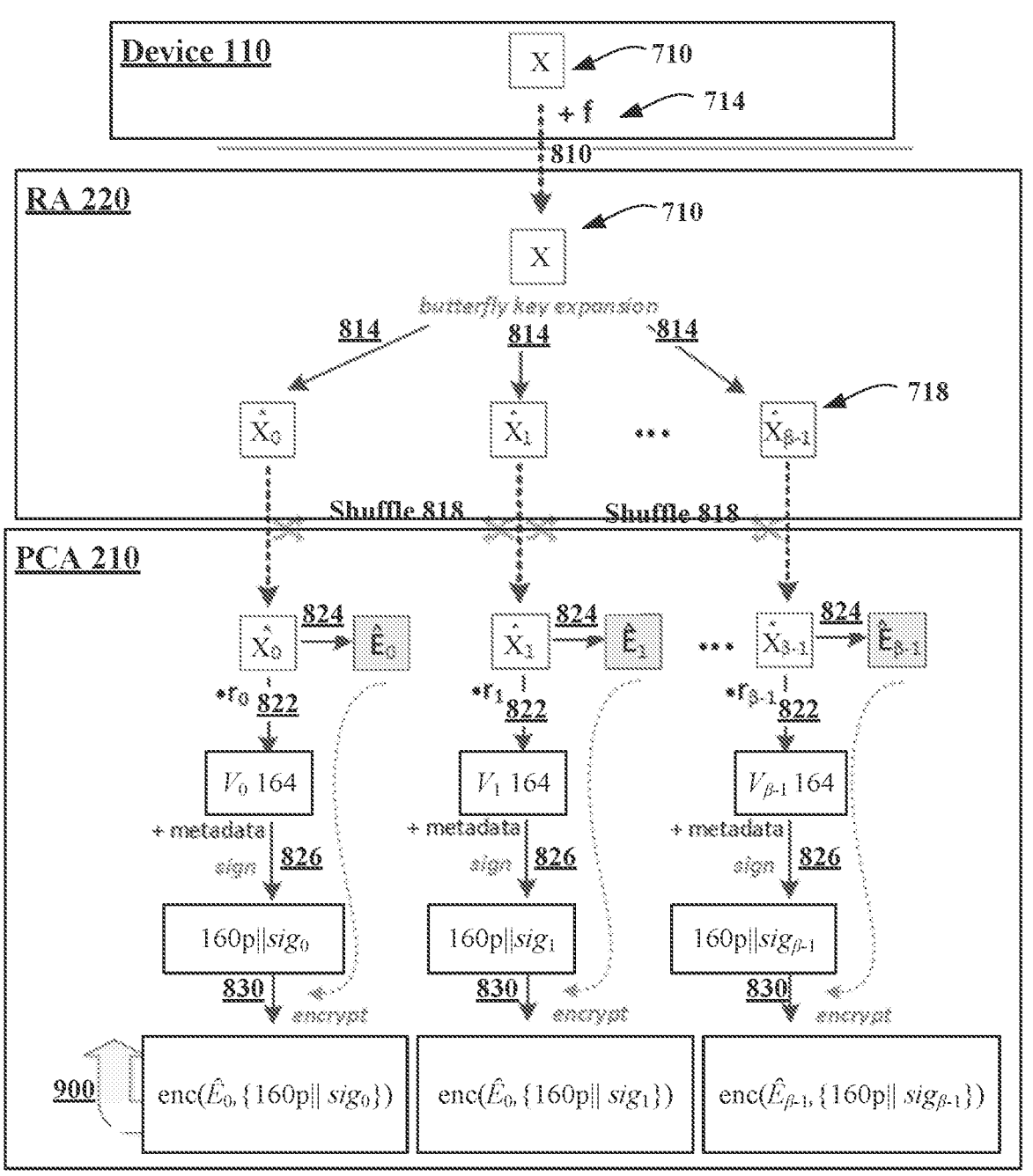
Figure 11B:
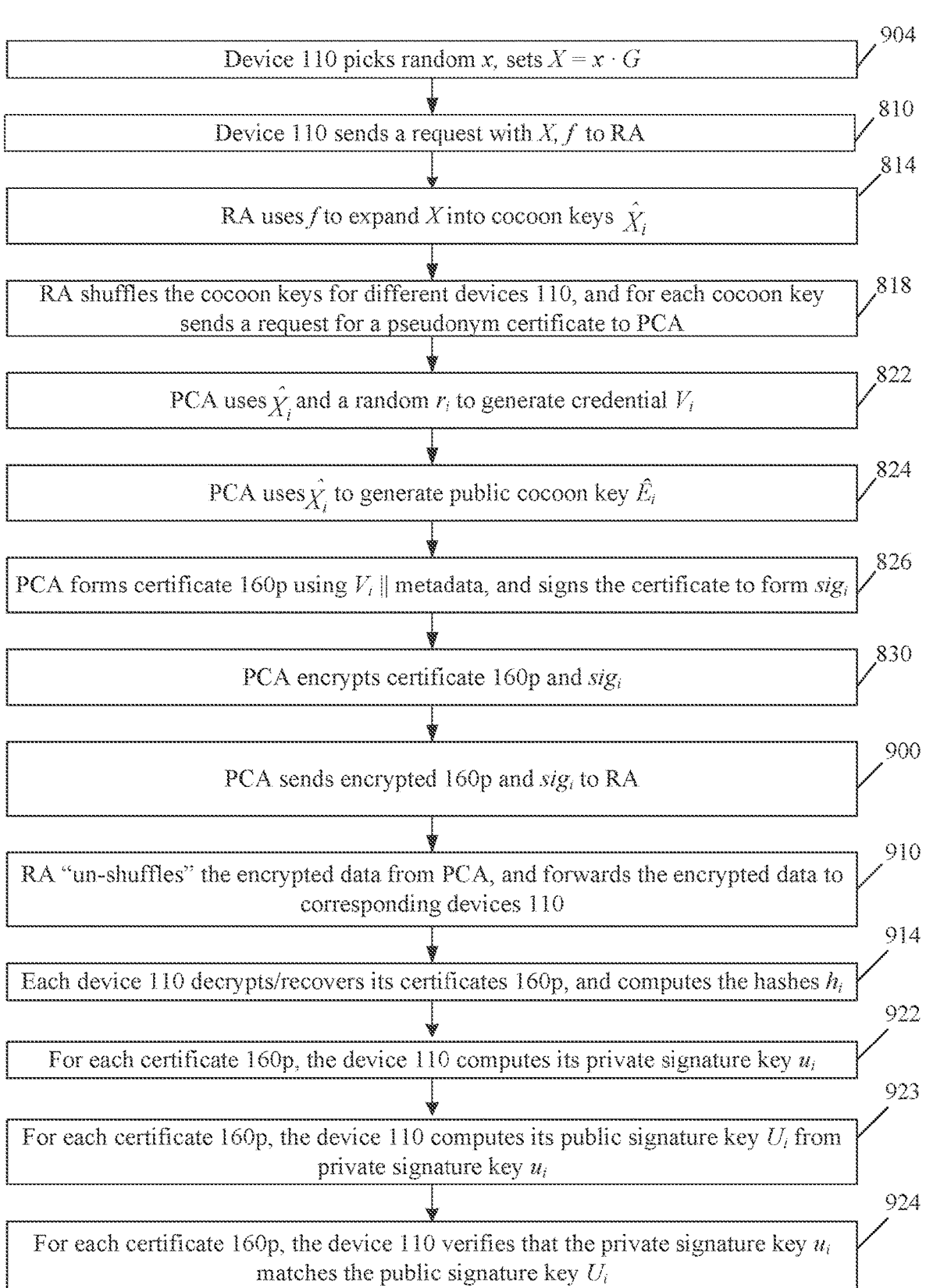

FIGS. 11A, 11B illustrate an implicit certificate scheme. Steps 904, 810, 814, 818 are as in FIGS. 10A-B. Then at step 822, the PCA computes a random $r_i$, and computes a credential 164:

$$V_i = \hat{X}_i + r_i \cdot G \tag{Eq. 17}$$

At step 824, the PCA generates a public cocoon encryption key $\hat{E}_i$, possibly using the same process as for the explicit certificates, e.g. according to equation (Eq. 13) or (Eq. 13').

At step 826, the PCA creates the implicit certificate 160*p*, also denoted cert$_i$, as:

$$\text{cert}_i = (V_i, \text{meta}) \tag{Eq. 18}$$

i.e.

$$\text{cert}_i = V_i \| \text{meta}$$

where "meta" is the metadata (including validity period 165 etc.).

Also at step 826, the PCA signs this certificate to obtain the signature sig as follows:

$$\text{sig}_i = h_i \cdot r_i + u_{PCA} \tag{Eq. 19}$$

where $h_i = \text{Hash}(\text{cert}_i)$.

At step 830, the PCA encrypts a package which includes (possibly consists of) the certificate 160*p* and the signature sig$_i$. The encryption uses the corresponding cocoon key $\hat{E}_i$. An exemplary encryption scheme is ECIES, but other schemes can also be used.

At steps 900 and 910, the encrypted package is sent to the requesting device 110 via the RA 220, possibly without being signed by the PCA (signature 730 is omitted), using the same process and data structures (including RA request data structures) as in FIGS. 10A-B. The RA cannot decrypt the package.

At step 914, the device 110 receives the encrypted package and the corresponding value i, computes the private key $\hat{e}_i$ as in equation (Eq. 14) or (Eq. 14'), uses this key to decrypt the PCA's response package cert$_i \| \text{sig}_i$, and then computes:

$$h_i = \text{Hash}(\text{cert}_i) \tag{Eq. 20}$$

At step 922, the device sets its own private signature key to:

$$u_i = h_i \cdot (x + f(i)) + \text{sig}_i \tag{Eq. 21}$$

and computes the corresponding public signature key at step 923 as:

$$U_i = u_i \cdot G \tag{Eq. 22}$$

The device 110 can then verify the validity of the public key $U_i$ by ascertaining, at step 924, that $$U_i = h_i \cdot V_i + U_{PCA} \tag{Eq. 23}$$

where $U_{PCA}$ is the PCA's public signature key.

Other features of some embodiments are described in Marcos A. Simplicio Jr. et. al., "The Unified Butterfly Effect: Efficient Security Credential Management System for Vehicular Communications", 2018, Cryptology ePrint Archive: Report 2018/089, https://eprint.iacr.org/2018/089.pdf, incorporated herein by reference.

Example Embodiments of Certificate Activation

In SCMS and other CRL based certificate revocation systems, the cost of checking whether a certificate is included in a given CRL grows linearly with then number of devices included in that CRL. Therefore, ensuring that the number of CRL entries remains small is beneficial not only to save bandwidth when distributing CRLs, but also to allow a faster and more energy-efficient verification of a certificate's revocation status. SCMS can use a Linkage Authority based mechanism for shortening the CRLs, which associates several certificates to the same entry (lv 234). But this mechanism also extends the lifetime of those entries in the CRL. The reason is that linkage seeds placed into a CRL can only be safely removed from the CRL after all certificates associated to those seeds are expired. Consequently, even if device revocation events occur at a low frequency, CRLs may actually grow big because the corresponding entries will remain in the CRL for a duration comparable to that of certificate batches (e.g., years).

Figure 12:
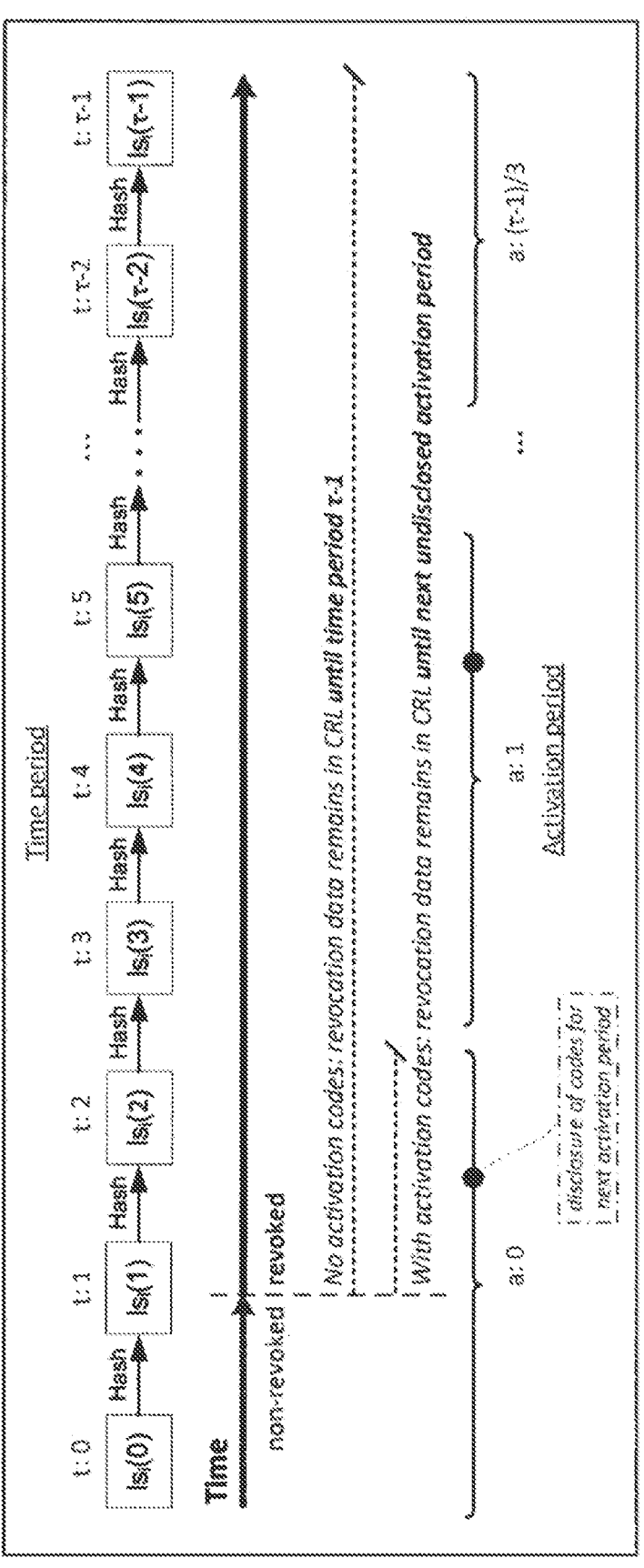
FIG. 12 illustrates a comparison of certificate revocation techniques including some techniques used in some embodiments of the present disclosure.

To avoid this growth of CRLs while preserving the performance gains associated with the butterfly key derivation, an activation code scheme is provided, some embodiments of which are usable with SCMS or eSCMS as explained below. The activation code is a bitstring without which the pseudonym certificates previously acquired cannot be used (for example, cannot be decrypted). Each activation code corresponds to a certain activation period, which spans one or more certificate validity periods 165. This is illustrated in FIG. 12, for each activation period covering 3 validity periods. The $\tau$ validity periods are marked t:0 through t:$\tau$−1 in the figure; the activation periods are marked a:0 through a:($\tau$−1)/3. If activation codes are not used, the revocation data remains in the CRL until the end of the last period $\tau$−1, i.e. until all the issued pseudonym certificates expire. If the activation codes are used, the revocation data remains in the CRL only until the end of the activation period, i.e. until all the issued and already activated pseudonym certificates expire.

The activation codes are derived by the vehicles (or other types of devices) from device specific values (DSVs) periodically disclosed to non-revoked vehicles, before the start of the corresponding validity periods 165, to allow timely activation of the certificates. In some embodiments, each activation code is a DSV. Each DSV corresponds to a specific vehicle and activation period. Revoked vehicles do not receive their DSVs, and are prevented from obtaining activation codes for their certificates, at least until their revocation status is removed. As a result, identifiers (pseudonyms or credentials 164, and/or linkage values 234, as well as any information that allow their computation) of revoked certificates that cannot be activated do not need to remain in CRLs, reducing the CRL size. For example, certificates could be valid for 1 week, whereas the activation period could be set to 4 weeks and the activation codes could be disclosed 1 week before they are actually required. In this case, identifiers for certificates from revoked vehicles would have to remain in CRLs for at most 4 weeks, since after that those vehicles would not receive new DSVs.

Some embodiments of the proposed scheme address the main shortcomings of IFAL and BCAM solutions in terms of performance and security, as discussed below.

Generating Activation Codes: Binary Hash Trees

Some embodiments of the present disclosure use binary hash trees 840 (FIG. 13) as described below. The use of trees is optional however.

Figure 13:
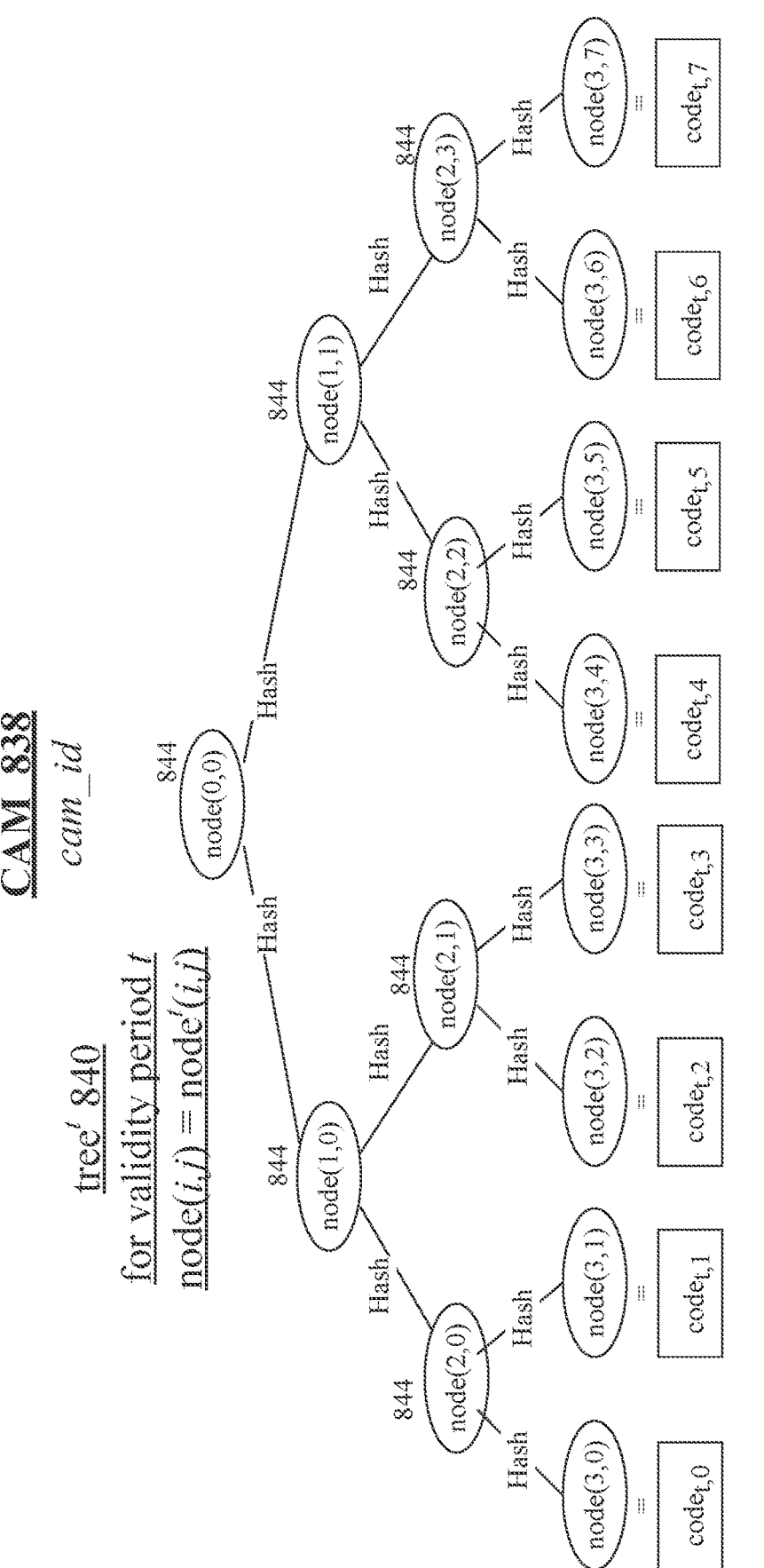
FIG. 13 illustrates a hash tree used in some embodiments of the present disclosure.

Similarly to BCAM, some embodiments include one or more Certificate Access Managers (CAM) 838, shown in FIG. 13, each possibly having a different identifier cam_id. CAMs 838 are entities responsible for creating and distributing device specific values (DSVs). A CAM can be implemented on one or more computer systems 316. To create and distribute the DSVs, CAM 838 creates, in its storage 150S (FIG. 2), a binary hash tree tree$^t$ (tree 840 in FIG. 13) for each time period t, i.e. each validity period 165. In some embodiments, only one tree 840 is created for each activation period even if the activation period consists of multiple validity periods. If the activation period spans n+1 validity periods, then tree$^t$= . . . =tree$^{t+n}$.

The tree's nodes 844 are denoted node$^t$(depth,count), or just node(depth,count) for brevity, where depth≥0 and 0≤count≤2$^{depth}$−1 indicate the node's position in the tree. The height of the tree matches the length of the vehicles' identifiers (VID), in bits. As a result, each leaf node$^t$(depth, count) can be used as a DSV to represent a single vehicle 110 in the system: the vehicle with VID=count. For brevity of notation, we denote by code$_{t,VID}$ the leaf of tree$^t$ whose index corresponds to a given VID, i.e.

$$\text{code}_{t,VID}=\text{node}^t(|VID|,VID) \tag{Eq. 24}$$

In Kumar et al., for example, the suggested length of VID is 40 bits, which is enough to cover more than 1 trillion vehicles. The bit lengths do not limit the invention.

The hash tree allows compressing the DSVs for distribution to the vehicles: all the leaves of any sub-tree can be distributed by distributing the root of the sub-tree, so if all the leaves of a sub-tree correspond to honest vehicles then only the root of the sub-tree needs to be distributed. Each node of the tree is accompanied by its (depth, count) parameter, so the vehicles can compute the leaf values from the node; in case of the root, for example, the (depth, count) parameter is (0,0).

In an exemplary embodiment, the nodes 844 are assumed to be k-bit long, yielding a k-bit security level (e.g., in modern deployments k could be 128). The tree 840 is built in the following manner. First, its root node$^t$(0,0) is set to a random bitstring, unique for each activation period. Every other node 844 is then computed from its parent node combined with a "security string" I, a node-specific suffix. More precisely, we have:

$$\text{node}^t(\text{depth,count})=\text{Hash}(\text{node}^t(\text{depth}-1,\lfloor\text{count}/2\rfloor)\|I) \tag{Eq. 25}$$

where the security string I is defined as $$I=(\text{cam\_id}\|t\|\text{depth}\|\text{count}) \tag{Eq. 26}$$

If the activation period spans multiple validity time periods 165, then t can be set to the first time period 165 covered by that activation period. This approach gives the system enough flexibility to increase or reduce the length of the activation periods without incurring the repetition of security strings. As further discussed in the Appendix, such non-repeatable security strings are useful to thwart birthday attacks analogous to those described in E. Biham, "How to decrypt or even substitute DES-encrypted messages in 228 steps," Inf. Process. Lett., vol. 84, no. 3, pp. 117-124, November 2002, incorporated herein by reference.

The Table below shows suggested lengths for the fields that compose those security strings, leading to |I|=104. This length is large enough to support 40-bit long VIDs for 2$^{24}$ time periods, which means more than 300000 years if the time periods are 1 week long. At the same time, it is unlikely to have any perceptible impact on the computation of activation trees 840, as long as the hash function's input fits its block size. For example, SHA-256 operates on 512-bit blocks, appending at least 65 bits to its input message (a bit '1' for padding, and a 64-bit length indicator); see NIST, Federal Information Processing Standard (FIPS 180-4)— SecureHash Standard (SHS), National Institute of Standards and Technology, U.S. Department of Commerce, National Institute of Standards and Technology, U.S. Department of Commerce (NIST), Gaithersburg, MD, USA, August 2015, DOI:10.6028/NIST.FIPS.180-4. Therefore, a single call to its underlying compression function is enough to process a 128 bit node value even when it is combined with a 319-bit or smaller security string.

TABLE

COMPONENTS OF THE SECURITY STRINGS EMPLOYED IN
THE ACTIVATION TREES ACCORDING TO SOME
EMBODIMENTS OF THE PRESENT DISCLOSURE

| Field | Suggested length (bits) | Description |
|---|---|---|
| depth | 8 | Node's depth in tree, starting at 0. Mandatory: \|depth\| ≥ lg(\|VID\|). |
| count | 40 | Node's index in the depth, starting at 0. Mandatory: \|count\| ≥ \|VID\|. |
| t | 24 | Time period to which the tree is associated |
| cam_id | 32 | CAM's identifier |

The equations (Eq. 25) and (Eq. 26), and other tree-related particulars, are optional and do not limit the invention.

Integrating Activation Codes into eSCMS Certificate Issuing Process

Figure 14A:
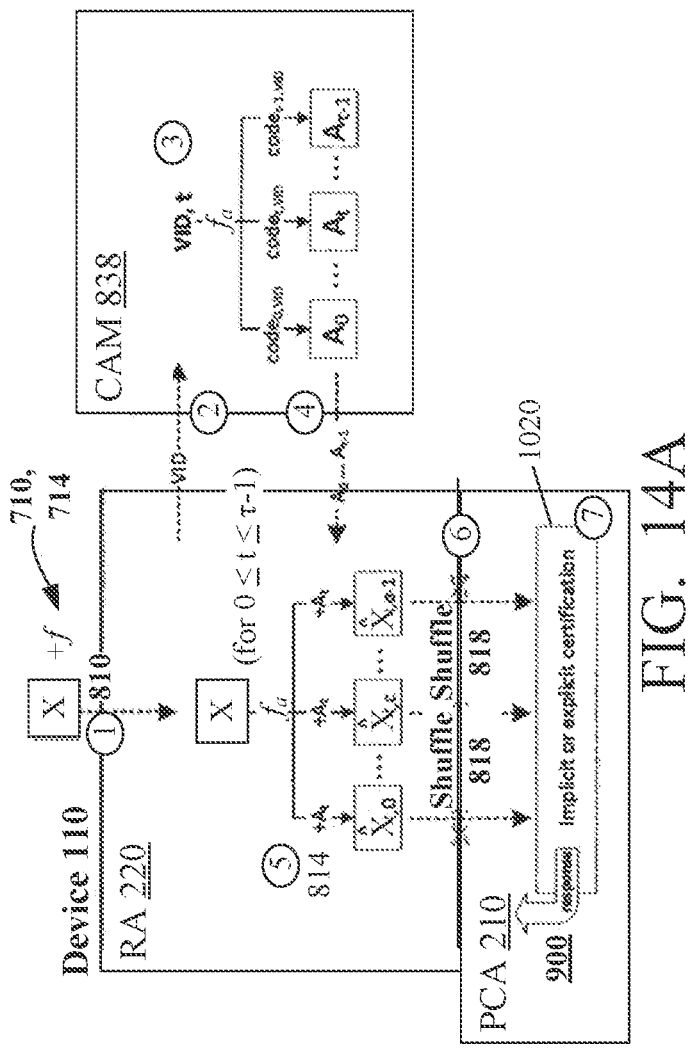

The binary hash trees 840 generated by CAM 838 are employed in the pseudonym certificate issuance process. One example is shown in FIGS. 14A and 14B. In FIG. 14A, the circled numbers 1 through 7 show the sequence of steps.

Steps 904, 810 are as in FIG. 10A-B or 11A-B; circled number 1 corresponds to step 810. Specifically, when a vehicle 110 (or other entity) with a given VID requests a batch of pseudonym certificates from the RA, the vehicle (through its device 110) provides the values (X, $f$) to the RA. Without loss of generality, we assume that the vehicle is requesting a batch of $\beta=\tau*\sigma$ certificates total, consisting of $\sigma$ certificates for each of the $\tau$ time periods (each time period corresponds to a validity period 165).

Upon reception of the vehicle's request (step 812, corresponding to circled numbers 2, 3, 4), for each time period, the RA sends the vehicle's VID and to the CAM, requesting the CAM to provide a blinded activation code $A_t$ for each time period t from 0 to $\tau-1$, inclusive. The CAM calculates (circled number 3) and returns (circled number 4) the blinded activation codes $A_t$ as follows:

$$A_t=f_\alpha(code_{t,VID},t,VID)\cdot G \qquad (Eq.\ 27)$$

This blinded activation code, when viewed as a public key component, corresponds to the following private key component:

$$a_t=f_a(code_{t,VID},t,VID) \qquad (Eq.\ 27')$$

This operation uses a pseudorandom function $f_a$, which could be instantiated, for example, using a NIST-approved PRF construction and $code_{t,VID}$ as secret seed. As a result, $f_a$'s output is unpredictable because the activation tree's leaf $code_{t,VID}$ has not yet been disclosed by the CAM. The CAM also blinds this value by multiplication by the elliptic curve generator G, so this value cannot be learned by the RA from the CAM's response. We note that, even though we assume for simplicity that a single CAM participates in the generation of certificate batches, in practice multiple CAMs could be contacted by the RA during this process, thus improving the system's resilience against the possibility of a CAM being compromised.

At step 814 (circled number 5), the RA performs the butterfly key expansion, generating cocoon keys. This process is similar to eSCMS, with one important difference: the blinded codes $A_t$ are incorporated into the cocoon keys. More precisely, let $\hat{X}_{t,c}$ denote the c-th public cocoon key for the time period t. This key is computed by the RA as:

$$\hat{X}_{t,c}=X+A_t+f(t\cdot\sigma+c)\cdot G \qquad (Eq.\ 28)$$

for each $0\le c<\sigma$ and $0\le t<\tau$. This public key corresponds to the following private key:

$$\hat{x}_{t,c}=x+a_t+f(t\cdot\sigma+c) \qquad (Eq.\ 28')$$

By using the pseudorandom function $f$ in the computation of cocoon keys $\hat{X}_{t,c}$, the RA ensures that they cannot be later correlated by the CAM or by the PCA, even for groups of keys computed using the same $A_t$. Therefore, this process preserves the unlinkability of pseudonym certificate requests, whether or not CAM and PCA collude.

At step 818 (circled number 6), as in the case of FIG. 10A-B or 11A-B, for each cocoon key $\hat{X}_{t,c}$, the RA generates an RA request, assigns to the request a unique request ID ("RA request ID"), and creates a data structure ("RA request data structure") containing the RA request ID, the cocoon key indices t and c, and the associated device request. The RA requests are shuffled together; the shuffling process is expected to include cocoon keys from different vehicles. The RA request is sent to the PCA with the RA request ID. Also sent with the request is metadata, e.g., the certificate's validity period 165 and the linkage value (lv) 234. The device ID is not provided to the PCA, so the PCA cannot associate the RA request with the device. Also, the PCA cannot determine whether different RA requests are associated with the same or different devices.

The PCA processing of each request can be as in FIG. 10A-B or 11A-B (steps 822-830), and is generally shown as step 1020 (circled number 7) in FIGS. 14A-B. The index i in FIGS. 10A-B and 11A-B corresponds to the pair (t,c) in FIGS. 14A-B.

More particularly, at step 1020, the PCA computes the public cocoon encryption key $\hat{E}_{t,c}$ as in equation (Eq. 13) or (Eq. 13'). Equation (Eq. 13) provides:

$$\hat{E}_{t,c}=\hat{X}_{t,c} \qquad (Eq.\ 13AC)$$

Equation (19') provides:

$$\hat{E}_{t,c}=Hash(\hat{X}_{t,c})\cdot G+\hat{X}_{t,c}. \qquad (Eq.\ 13AC')$$

The PCA also computes the vehicle's (implicit or explicit) pseudonym certificate, as at steps 822, 826 in FIGS. 10A-B, 11A-B.

The resulting certificates are concatenated with appropriate values ($r_i$ or $sig_i$ in FIG. 10A-B or 11A-B, where the index i corresponds to the (t,c) pair) to form a package which is then encrypted with $\hat{E}_{t,c}$ (step 830) before being sent back to the RA at step 900. The RA, in turn, un-shuffles the packages and relays them to the corresponding vehicle, without contacting the CAM again (step 910), as in FIG. 10A-B or 11A-B.

Since the PCA processing (steps 1020, 900) and subsequent RA processing (step 910) are identical to eSCMS, the processing costs and bandwidth usage at the PCA remain unchanged. In addition, the underlying security properties of eSCMS still apply, including the protection against MitM attacks performed by the RA.

As a result of this process, the certificate encrypted by $\hat{E}_{t,c}$ can only be decrypted if the vehicle also obtains the corresponding DSV=$code_{t,c}$. After all, in case of equation (Eq. 13AC'), the decryption key is now computed as:

$$\hat{e}_{t,c}=Hash(\hat{X}_{t,c})+\hat{x}_{t,c} \qquad (Eq.\ 29')$$

where $\hat{x}_{t,c}$ is defined given by equation (Eq. 28').

so

In case of equation (Eq. 13), the decryption key is:

$$\hat{e}_{t,c}=\hat{x}_{t,c} \qquad (Eq.\ 29)$$

Moreover, for unified butterfly keys, the key $\hat{X}_{t,c}$ received by the PCA depends on $code_{t,VID}$, and so does the private signature key $u_{t,c}$ whether it is computed in the explicit or implicit model. More precisely, for explicit certificates we have, if the processing is as in equation (Eq. 12):

$$u_{t,c} = x + f_a(\text{code}_{t,VID}, t, \text{VID}) + f(t*\sigma+c) + r_{t,c}$$

where $r_{t,c}$ is generated by the PCA at step such as 822 (FIGS. 10A-B) and sent (encrypted) to the vehicle at step 900.

If the processing is as in equation (Eq. 12'), then:

$$u_{t,c} = r_{t,c}(x + f_a(\text{code}_{t,VID}, t, \text{VID}) + f(t*\sigma+c))$$

For implicit certificates, the private key is $$u_{t,c} = h_{t,c}(x + f_a(\text{code}_{t,VID}, t, \text{VID}) + f(t*\sigma+c)) + \text{sig}_{t,c}$$

Therefore, to keep a vehicle with an identifier $VID_r$ from activating its certificates, it suffices to prevent the vehicle from obtaining its DSV=$\text{code}_{t,vID_r}$. In that case, the CRL entries for that vehicle's certificates do not need to remain in CRLs any longer than one or a few activation periods.

Distributing Activation Codes

As shown in FIG. 14B at step 911, some time before each validity period t (period 165), CAM 838 determines the leaf node indices (depth,count) of the valid vehicles (or other devices), and determines a minimal set of node indices (depth, count) from which the leaf node values (DSVs) can be computed for the valid vehicles via equations (Eq. 25) and (Eq. 26) but not by any revoked vehicle. The minimal set can be determined as in BCAM for example: each node index in the minimal set is a root of a subtree whose leaves correspond to only "honest" (valid) vehicles.

The CAM then distributes the node$^r$(depth,count) values of the minimal set from the tree 840 corresponding to the relevant period t. These values can be distributed to only the non-revoked vehicles, or can be broadcast to all vehicles; there is no need for bidirectional connectivity between vehicles and CAMs. Each node$^r$ value is accompanied by its t and (depth, count) parameters. These values can be provided to an intermediate system (not shown) for caching; each vehicle can obtain these values from the intermediate system at a time convenient for the vehicle.

As is clear from the above, the tree's nodes of the minimal set depend on which nodes are currently revoked/suspended, taking into account that every node of binary hash trees can be computed from its parent. For example, given the root of the tree, all of its leaves can be computed and, thus, all vehicles can obtain their corresponding activation codes. Hence, if no vehicle is revoked in time period t, the CAM only needs to broadcast node$^r$ (0,0) to allow all certificates in the system to be activated. This leads to optimal performance when distributing activation codes.

When a vehicle needs to be revoked, however, the CAM does not reveal any of the nodes in the path between the corresponding leaf and the tree's root. This prevents the computation of that leaf by any device, including a non-revoked vehicle that might try to collude with a revoked device to allow the activation of the latter's certificates. For example, consider the tree shown in FIG. 13. To revoke the vehicle whose VID is 4, the CAM would have to broadcast only the following nodes: node (1,0), which enables the computation of leaves nodes (3,0) through (3,3); node (2,3), used to compute leaves node (3,6) and node (3,7); and leaf node (3,5). More generally, and as mentioned in Kumar et al., when $n_r$ users out of $n_t$ are revoked the number of nodes included in the message broadcast by the CAM is on average $n_r \cdot \lg(n_t/n_r)$ for $1 \le n_r \le n_t/2$ (cf. Theorem 1 of W. Aiello, S. Lodha, and R. Ostrovsky, "Fast digital identity revocation (extended abstract)," in Proc. of the 18th Annual International Cryptology Conference on Advances in Cryptology (CRYPTO'98). London, UK, UK: Springer-Verlag, 1998, pp. 137-152), incorporated herein by reference. Hence, albeit more expensive than the scenario in which no revocation occurs, this approach is still more efficient than the individual delivery of each activation code. Actually, there are also efficient methods for encoding binary hash trees such as those hereby described, so the index of each node included in the broadcast message can be represented with less than |VID| bits (cf. Section 4.4 of Kumar et al.), saving some bandwidth.

At step 914, each non-revoked device 110 computes its leaf value $\text{code}_{t,VID}$ (the DSV) from the values distributed by the CAM at step 911. This computation can be done according to equations (Eq. 25) and (Eq. 26).

Also at step 914, each non-revoked device 110 determines, for each encrypted certificate 160$p$, the decryption key per equations (Eq. 29) or (Eq. 29'). The device uses the decryption key to decrypt the certificate.

The remaining steps can be as in eSCMS, including the verification of the PCA signature formed at step 826, and determining the device's signature key $u_{t,c}$.

Security of the Certificate Issuance Process

In AC/PC (Activation Codes for Pseudonym Certificates, such as shown in FIGS. 14A-B), a collusion between CAM and PCA (respectively RA) reveals as much information as the PCA (respectively RA) had available in eSCMS. Indeed, if we remove the influence of $A_t$ over the public cocoon keys computed as described in FIGS. 14A-B, the result matches the public cocoon keys in eSCMS. Therefore, a collusion with the CAM can only remove the entropy introduced by this entity, while still preserving eSCMS's security properties.

In particular, a vehicle's caterpillar private key x remains protected by the elliptic curve discrete logarithm problem (ECDLP) during the whole execution of the protocol. Hence, the RA, PCA and CAM are unable to recover the signature or decryption private keys derived from it, even if they collude. Unlinkability among certificates is similarly preserved, as long as the RA and PCA do not collude: the shuffling done by the RA still hides from the PCA any relationship between certificate requests intended for a same vehicle; meanwhile, the PCA's encrypted response prevents anyone but the appropriate vehicle from learning $\text{cert}_t$. Finally, since the (unified) butterfly key expansion process grants vehicles the ability to verify whether or not the received certificates were generated in a fair manner, MitM attacks (e.g., by the RA) are averted.

It is worth mentioning that the aforementioned CAM's inability to create a new threat via collusion is not just a fortunate coincidence. Actually, the (unblinded) activation codes $\text{code}_{t,VID}$ are the only information that is initially kept secret by the CAM and, thus, that could be contributed in such collusion. Since those codes are periodically disclosed to allow vehicles to activate their certificates, though, such public disclosure should not negatively impact the system's security. Consequently, a "private disclosure" during a collusion is expected to have an analogous result.

Security of the Revocation Procedure

The security features discussed below do not limit the invention. The invention may cover embodiments that do not possess such features.

The security of AC/PC's revocation procedure relies on the first pre-image resistance of the hash function employed for the construction of activation trees 840, as well as the proper disclosure of its nodes by the CAM. In principle, this means that the choice of a secure hash function is enough to enforce revocation. At least this should be the case if we assume that the system's entities would gain nothing by illegitimately un-revoking vehicles, i.e., without authorization from the MA. Nonetheless, it is useful to evaluate what happens when one of the system's entities is compromised and, as a result, its capabilities are misused aiming to allow the activation of revoked devices.

On the one hand, a rogue/compromised CAM could disclose the roots of every activation tree to all vehicles, even revoked ones, allowing all certificates in the system to be activated. This would not give the attacker any advantage over the system, though, besides disrupting its ability to revoke devices in an efficient manner. In particular, in consonance with the discussion in the preceding section, Security Of The Certificate Issuance Process, this would not grant the CAM or any other entity the ability to track devices. Consequently, it is unlikely that the CAM itself would go rogue and engage in such malicious activity. Furthermore, if the CAM's storage is somehow compromised, the leakage of codes can still be contained by keeping the revoked vehicles' data in CRLs, just like in the original SCMS or eSCMS. Hence, the attack would not result in any catastrophic security breach, but only nullify the performance gains provided by activation codes.

On the other hand, a security breach at the RA or PCA should not reveal any information about activation codes. The reason is that these entities never learn such codes, which are only known by the CAM. Nevertheless, if any of these entities goes rogue or is compromised at a level that allows its behavior to be controlled by attackers, it can provide valid certificates to revoked vehicles independently of activation codes. Specifically, a dishonest PCA can always issue new pseudonym certificates for vehicles, including revoked ones, at least until the PCA itself is revoked. A compromised RA could act similarly, e.g., by requesting pseudonym certificates for a non-revoked $VID_d$, and then delivering those certificates to a revoked vehicle whose identifier is $VID_r \neq VID_d$. Such misbehavior is likely to go unnoticed, because the certificates do not carry any VID on them. In addition, if $VID_d$ corresponds to a valid vehicle whose pseudonym certificates have not been requested yet, the CAM would not be able to notice the fraud by the RA. Actually, even if $VID_d$ has already been requested in the past, trying to prevent such attack by configuring the CAM to refuse a second request for the same $VID_d$ is likely to create management issues. For example, the processing of the initial request for $VID_d$ may naturally fail, so an honest RA would actually need to send a second request referring to the same $VID_d$. As another example, a dishonest RA might abuse this process by performing a "denial-of-certification" attack: the RA queries the CAM requesting the caterpillar keys for a non-revoked $VID_d$, but it does not execute the pseudonym certificate issuance process; future requests referring to $VID_d$, potentially by honest RAs, would then fail.

These observations indicate that, even if a rogue RA or PCA never gains access to activation codes, their roles in the system still enable them to provide valid certificates for revoked vehicles. Actually, a similar discussion also applies to the original BCAM protocol, in which a rogue RA or PCA could provision revoked vehicles with the PCA-encrypted certificates, before they are once again encrypted by the CAM. Nevertheless, AC/PC's approach of ensuring that only the CAM is able to distribute activation codes was adopted because, even though this does not actually prevent such threats, it does reduce the system's attack surface. For example, suppose that RA and/or PCA store the (PCA-encrypted) certificates generated for the purposes of disaster recovery, as proposed in Kumar et al., Section 5.3.3. If this case, a data breach disclosing the certificates issued for a vehicle that is now revoked does not create any security concern, since that vehicle remains unable to decrypt those certificates. To compensate this inability of using those certificates for disaster recovery for non-revoked devices, RA and PCA could then issue new pseudonym certificates, possibly revoking the old ones.

In some embodiments, the activation codes are available to the RA or PCA or both. For example, the blinded activation codes $A_t$ and corresponding $a_t$ may be computed by the RA from the activation codes.

In some embodiments, the trees 840 are not used; the CAM distributes the leaf node values or the $a_t$ values for example.

In some embodiments, vehicles may be equipped with a hardware security module (HSM), which might be deactivated via a "soft-revocation" mechanism: instead of asking the CAM to omit nodes from the binary tree, the Misbehavior Authority could periodically issue a soft-revocation list (SRL) containing identifiers of revoked vehicles; as a result, the HSMs of vehicles listed in the SRL are expected to simply refuse to compute the decryption keys for the corresponding certificates. To enable this feature, the HSM may export a CAM-encrypted symmetric key k, which is included in the vehicle's request for pseudonym certificates. Then, the CAM can ensure that the HSM is the only entity capable of decrypting certificates by computing the blinded activation values as $f_a(k, code_{t,VID}, t, VID) \cdot G$. The advantage of this approach is that it potentially leads to smaller messages broadcast by CAMs. After all, the (hard) revocation of vehicles forces the CAM to disclose multiple nodes of the revocation tree, rather than only its root. If, however, those vehicles are known to be soft-revoked due to a compliant HSM, the activation tree's root can be disclosed without negative impacts to the system's security.

Comparison with Related Works: IFAL and BCAM:

When compared to IFAL, AC/PC (FIGS. 14A-B) differs in at least two important aspects. First, IFAL allows an "honest but curious" PCA to link several certificates to a same device; this privacy issue is absent in the solution hereby described if we assume, like in the original SCMS, that PCA and RA do not collude. Second, AC/PC allows vehicles to obtain activation much more efficiently than IFAL's strategy, using binary hash trees to broadcast activation codes rather than requiring vehicles to individually request them.

Architecturally, AC/PC shares more similarities with BCAM than with IFAL, in particular because both BCAM and our proposal use binary hash trees for the distribution of activation codes. Nevertheless, by integrating security strings into the activation trees, the nodes of those trees can be 128-bit long while still preserving a 128-bit security level, despite the number of revoked devices. When compared to BCAM, which uses 256-bit nodes, this represents a 50% bandwidth gain for the distribution of activation trees.

In terms of processing, the resulting design leads to costs slightly higher than those obtained with BCAM; this happens because the symmetric encryption at the CAM and subsequent decryption at vehicles are replaced by the computation of one elliptic curve point, $A_t$, for each activation period. However, this saves bandwidth between the RA and the CAM, because these entities only exchange data that represent nodes from activation trees, rather than batches of certificates. Even more importantly, the fact that the CAM does not receive certificates from the RA prevents the former from learning which PCA encrypted certificates belong to a same device. In addition, as discussed at the end of the previous section on Security Of The Revocation Procedure, it also reduces the attack surface by a rogue RA or PCA. Hence, the AC/PC is able to protect the vehicle's privacy even if PCA and CAM collude or are compromised.

The AC/PC solution introduces a novel approach for issuing pseudonym certificates and distributing activation codes for previously issued pseudonym certificates, efficiently preventing revoked devices from using those certificates. When compared to the state-of-the-art, it brings advantages in terms of security and efficiency. Namely, it reduces the sizes of CRLs, such as those employed in solutions such as SCMS and eSCMS. It also reduces computational costs, especially in terms of bandwidth usage, when compared with solutions such as BCAM. Finally, it avoids the creation of points of collusion, so it is not possible for the PCA alone to violate the users' privacy (unlike IFAL), nor for the PCA and CAM to collude for this purpose (unlike BCAM). The solution is also suitable for non-pseudonym certificates.

Integrating Activation Codes into Other Certificate Issuing Process

Similar activation techniques can be used with SCMS (FIGS. 7, 8). For example, the RA may compute $A_t$ and $\hat{X}_{t,c}$ as described above for eSCMS, and determine the encryption key $\hat{E}_{t,c} = \hat{E}_i$ per equation (Eq. 13AC) or (Eq. 13AC'). The steps 822 through 900 can be as in FIG. 7 or 8. The activation can be as in FIG. 14B at steps 911-914.

The invention is not limited to the embodiments described above. Some embodiments are defined by the following clauses:

Clause 1 defines a method for digital certificate management by entities (such as the RA, PCA, CAM, or devices 110; the examples in the parentheses below do not limit the clauses). Such entities are operable to perform computing on digital values and to communicate with each other (the entities can be computer systems as in FIG. 2). The digital certificates are for use by devices (e.g. vehicles and non-vehicular devices 110) in authentication operations, each device being one of the entities. The digital certificates may or may not be pseudonym certificates. Each digital certificate is to be activated by an associated activation code (e.g. code$_{t,c}$). The method comprises:

receiving, by a first entity (e.g. RA), one or more device requests from one or more devices, each device request requesting one or more digital certificates for the associated device (note step 810 for example);

for each device request, performing operations of:

obtaining by the first entity, using information on the associated device (e.g. using VID), one or more blinded activation codes (e.g. $A_t$) associated with one or more activation codes (e.g. code$_{t,c}$ or $a_t$)) associated with one or more digital certificates to be issued for the device, wherein the first entity is unable to determine the one or more associated activation codes;

generating, by the first entity, one or more certificate generation requests, each certificate generation request being generated using the associated blinded activation code;

sending to a certificate authority (CA), by the first entity, each certificate generation request (the certificate generation request may include $\hat{X}_{t,c}$), wherein the CA is unable to link the certificate generation request to the associated device (see step 818);

wherein the CA is operable to generate, from each certificate generation request, an encrypted digital package which is an encryption of a digital package comprising an associated digital certificate which is recoverable from the encrypted package by the associated device using the associated activation code.

2. A method for digital certificate management by entities operable to perform computing on digital values and to communicate with each other, the digital certificates being for use by devices in authentication operations, each device being one of the entities, wherein each digital certificate is to be activated by an associated activation code, the method comprising:

receiving, by a first entity, one or more device requests from one or more devices, each device request requesting one or more digital certificates for the associated device;

for each device request, performing operations of:

obtaining by the first entity, using information on the associated device, one or more blinded activation codes associated with one or more activation codes associated with one or more digital certificates to be issued for the device, wherein each blinded activation code is determined using an output of a pseudorandom function (e.g. $f_a$; see equation (27); the pseudorandom function can be a combination of $f_a$ and other functions) applied to an input (e.g. VID and/or code$_{t,c}$ and/or other information) comprising the information on the associated device (VID);

generating, by the first entity, one or more certificate generation requests, each certificate generation request being generated using the associated blinded activation code;

sending to a certificate authority (CA), by the first entity, each certificate generation request;

wherein the CA is operable to generate, from each certificate generation request, an encrypted digital package which is an encryption of a digital package comprising an associated digital certificate which is recoverable from the encrypted package by the associated device using the associated activation code.

3. The method of clause 1 or 2, wherein each activation code depends on an interval of time for which each associated digital certificate is to be activated.

4. The method of any preceding clause, wherein the CA is unable to determine the associated activation code nor the associated blinded activation code.

5. The method of any preceding clause, wherein the one or more certificate generation requests comprise a plurality of certificate generation requests, and the CA is unable to determine whether any certificate generation requests are associated to a single device.

6. The method of any preceding clause, further comprising, for each certificate generation request, generating, by the CA, an encrypted digital package which is an encryption of a digital package comprising an associated digital certificate which is recoverable from the encrypted package using an activation code associated with the blinded activation code;

wherein generating the digital encrypted package comprises:

generating the digital package;

generating an encryption key to depend on the blinded activation code;

encrypting the digital package under the encryption key.

7. The method of any preceding clause, wherein the blinded activation code is provided to the first entity by a second entity (e.g. CAM) that generated the associated activation code and computed the blinded activation code from the activation code.

8. The method of clause 7 wherein the second entity and the CA together are unable to link the blinded activation code to any associated certificate generation request.

9. The method of any preceding clause wherein each digital certificate is a pseudonym certificate.

10. A first device operable to perform computing on digital values and to wirelessly communicate with other entities, the first device being configured to perform as a device in a method according to any one or more of clauses 1 through 9.

11. A computer readable medium comprising computer instructions operable to cause one or more computer processors to operate as the first device of clause 10.

12. A digital certificate management entity operable to perform computing on digital values and to communicate with other entities, the digital certificate management entity being configured to perform as a first entity in a method according to any one or more of clauses 1 through 9.

13. A digital certificate management entity operable to perform computing on digital values and to communicate with other entities, the digital certificate management entity being configured to perform as the second entity providing the blinded activation codes to the first entity in a method according to any one or more of clauses 7 and 8.

14. A digital certificate management entity operable to perform computing on digital values and to communicate with other entities, the digital certificate management entity being configured to perform as a certificate authority in a method according to any one or more of clauses 1 through 9.

15. A computer readable medium comprising computer instructions operable to cause one or more computer processors to operate as the digital certificate management entity of any one or more of clauses 12 through 14.

Other embodiments are within the scope of the invention, as defined by the appended claims.

APPENDIX

Birthday Attack Against BCAM's Hash Trees

The structure of BCAM's binary hash trees is such that their k-bit nodes are computed via iterative hashing, using a constant suffix for each branch. More precisely, starting from a random root $node^t(0,0)$, each node $node^t(depth, count)$ of $tree^t$ is computed from its parent as follows:

$$node^t(depth,count)=Hash(node^t(depth-1,\lfloor count/2 \rfloor) \| b^p),$$

where b=0 (resp. b=1) if the node is a left (resp. right) child, and p≥1 is a suitable padding length. For example, when k=256 and the hash function employed is SHA-256, adopting 1≤p<192 would allow the underlying compression function to be called only once when computing any node of the tree.

Suppose that a vehicle with identifier $VID_r$ is revoked. In that case, the leaf $node^t$ ($|VID_r|, VID_r$) should not be computed from the message broadcast by the CAM, for every future value of t. This means that the set $N_r$ of all nodes in the path between the root and that leaf must remain secret. To accomplish this, the CAM only broadcasts children of the nodes in $N_r$. For example, as mentioned in the description of certificate activation above, the revocation of $node^t(3,4)$ leads to the disclosure of the set $N_d=\{node^t(1,0), node^t(2,3), node^t(3,5)\}$. As long as the tree is built using a secure hash function, it is not straight-forward to use any node in $N_d$ to compute nodes in the set $N_r=\{node^t(0,0), node^t(1,1), node^t(2,2), node^t(3,4)\}$. Indeed, doing so corresponds to finding pre-images for nodes in the set $N_d$.

To overcome the security of BCAM's activation trees, the following attack strategy can be employed to recover activation codes for revoked vehicles. First, the attacker picks an arbitrary k-bit long $link^0$, and arbitrarily chooses between b=0 or b=1. The value of $link^0$ is then used as the anchor for a hash chain of the form $link^j=Hash(link^{j-1}\|b^p)$, until $2^n$ hashes are performed. For simplicity, we assume that no collision occurs during this process, i.e., that $link^j \neq link^{j'}$ for all j≠j'. Nevertheless, this simplification comes without loss of generality because, whenever there is a collision, the attacker could simply (1) save the current chain, (2) pick a new anchor distinct from any previously computed $link^j$, and then (3) start a new chain from this anchor. Actually, picking different anchors for building multiple chains is likely advantageous anyway, because this facilitates the parallel processing of hashes. As long as $2^n$ different hashes are made available in this manner, the attack can proceed.

Due to the birthday paradox, an attacker that gathers $2^m$ nodes disclosed by the CAM has a high probability to find a match between at least one of those nodes and some of the $2^n$ previously computed $link^j$ if m+n≥k. Suppose that a match occurs between $link^j$ and $node^t(depth, count)$. In this case, $link^{j-1}$ is a valid pre-image for $node^t(depth, count)$ with padding $b^p$. Hence, if the attacker picked b=0 and $node^t$ (depth, count) is a left child, it is very likely that $link^{j-1}$ will match the parent of $node^t(depth, count)$ in the activation tree—unless $link^{j-1}$ is a second pre-image rather than the actual pre-image. If the parent of $node^t(depth, count)$ is also a left child, its own parent is also likely to match $link^{j-2}$, and so forth. An analogous argument applies if b=1 and $node^t$ (depth, count) is a right child. As a result, such collisions have roughly 50% of chance of giving the attacker access to nodes belonging to the revoked set $N_r$. All certificates whose revocation depended on those nodes can then be activated.

Considering this attack scenario, the growth of the number of revoked devices has two negative effects on the system's security. First, the recovery of one node from the set $N_r$ becomes more likely to give access to activation codes of multiple revoked devices. The reason is that a node in a given position of the tree always allow the computation of a same number of leaves (the lower the depth, the higher this number). When the number of revoked devices increase, so does the number of leaves covered by that node that should remain concealed to prevent the corresponding activation codes from being recovered. Second, the number of nodes disclosed by the CAM that would lead to useful collisions also grows, i.e., the value of m becomes larger.

Since such attacks trade time for space, one possible defense strategy is to adopt a large enough k parameter. For example, the authors of BCAM suggest k=256 (cf. Kumar et al., Section 4.1.3), meaning that the attacker would have to compute, say, $2^n=2^{128}$ hashes and then gather $2^m=2^{128}$ nodes from the CAM before a collision actually occurs. Therefore, in practice, the attacks hereby described do not pose an actual security threat to BCAM. Nevertheless, there is a more efficient defense strategy for this issue, originally discussed by F. Leighton and S. Micali, "Large provably fast and secure digital signature schemes based on secure hash functions," Jul. 11, 1995, U.S. Pat. No. 5,432,852, incorporated herein by reference, in the context of hash-based signatures (D. McGrew, M. Curcio, and S. Fluhrer, "Hash-based signatures," Internet Engineering Task Force, Internet-Draft draft-mcgrew-hashsigs-06, mar 2017, work in Progress. [Online]. Available: https://datatracker.ietf.org/doc/html/draft-mcgrew-hash-sigs-06): to use a different suffix for each node computation. This strategy comes from the observation that collisions between $link^j$ and $node^r$(depth, count) are useless if they are computed with different suffixes. After all, in that case $link^{j-1}$ will not match the parent of $node^r$(depth, count), i.e., it will necessarily be second pre-image rather than the actual pre-image of that node. At the same time, attackers are unable to gather more than 1 value of $node^r$(depth, count) for a given suffix. Consequently, to obtain a high probability of collisions for that suffix, the attacker would have to build a table with $2^n=2^{k-m}=2^k$ entries. In other words, this approach leads to a system with a 128-bit security level when the nodes themselves are 128-bit long.

The invention claimed is:

1. A method by a registration authority (RA) operating in a security credential management system, the method comprising:

receiving by the RA a certificate request from an end entity, the certificate request requesting a certificate;

transmitting by the RA a request for a blinded activation value to a certificate access manager (CAM), the blinded activation value request containing identification information for the associated end entity;

obtaining by the RA from the CAM a blinded activation value, wherein the blinded activation value is an elliptic curve point generated by multiplication of an activation code by a generating point G, the blinded activation value for use in encrypting the certificate to be provided to the end entity, wherein the blinded activation value is added to a cocoon public key to modify the cocoon public key;

shuffling by the RA the certificate request with other certificate requests from other end entities;

transmitting by the RA to a certificate authority (CA) the cocoon public key modified with the addition of the blinded activation value;

wherein the CA generates a response structure comprising the certificate, wherein the certificate is encrypted using the blinded activation value obtained from the CAM and cannot be accessed by the end entity until provided with the activation code from the CAM;

wherein the RA does not know the certificate sent to the end entity because the certificate is encrypted, wherein the CA is not able to determine the end entity to which the certificate belongs.

2. The method of claim 1, wherein the activation code depends on an interval of time for which the certificate is to be activated.

3. The method of claim 1, comprising generating by the RA at least one cocoon key using the blinded activation value.

4. The method of claim 1 wherein the activation code is calculated using a binary hash tree structure comprising a plurality of nodes.

5. The method of claim 4 wherein at least one node of the binary hash tree structure corresponds to the end entity.

6. The method of claim 1 wherein the certificate comprises an authorization certificate.

7. The method of claim 1 wherein the certificate comprises a pseudonym certificate.

8. The method of claim 1 wherein the (CA) comprises a pseudonym certificate authority (PCA).

9. The method of claim 1 wherein the blinded activation value comprises a blinded activation code.

10. A computer system comprising one or more hardware processors and non-transitory computer storage, the computer system being programmed to perform as a registration authority (RA) operating in a security credential management system, the RA being programmed to:

receive a certificate request from an end entity, the certificate request requesting a certificate;

transmit a request for a blinded activation value to a certificate access manager (CAM), the blinded activation value request containing identification information for the associated end entity;

obtain from the CAM a blinded activation value, wherein the blinded activation value is an elliptic curve point generated by multiplication of an activation code by a generating point G, the blinded activation value for use in encrypting the certificate to be provided to the end entity, wherein the blinded activation value is added to a cocoon public key to modify the cocoon public key;

shuffle the certificate request with other certificate requests from other end entities;

transmit to a certificate authority (CA) the cocoon public key modified with the addition of the blinded activation value;

wherein the CA generates a response structure comprising the certificate, wherein the certificate is encrypted using the blinded activation value obtained from the CAM and cannot be accessed by the end entity until provided with the activation code from the CAM;

wherein the RA does not know the certificate sent to the end entity because the certificate is encrypted, wherein the CA is not able to determine the end entity to which the certificate belongs.

11. The system of claim 10, wherein the activation code depends on an interval of time for which the certificate is to be activated.

12. The system of claim 10, wherein the RA is further programmed to generate at least one cocoon key using the blinded activation value.

13. The system of claim 10 wherein the activation code is calculated using a binary hash tree structure comprising a plurality of nodes.

14. The system of claim 13 wherein at least one node of the binary hash tree structure corresponds to the end entity.

15. The system of claim 10 wherein the certificate comprises an authorization certificate.

16. The system of claim 10 wherein the certificate comprises a pseudonym certificate.

17. The system of claim 10 wherein the (CA) comprises a pseudonym certificate authority (PCA).

18. The system of claim 10 wherein the blinded activation value comprises a blinded activation code.

* * * * *